US008350430B2

(12) United States Patent
Komuro et al.

(10) Patent No.: US 8,350,430 B2
(45) Date of Patent: Jan. 8, 2013

(54) ROTATING MACHINE WITH SINTERED MAGNET AND METHOD FOR PRODUCING SINTERED MAGNET

(75) Inventors: Matahiro Komuro, Hitachi (JP); Yuichi Satsu, Hitachi (JP); Yoshii Morishita, Tsukuba (JP); Shigeaki Funyu, Tsuchiura (JP); Mitsuo Katayose, Tsukuba (JP)

(73) Assignee: Hitachi, Ltd., Tokyo (JP)

( * ) Notice: Subject to any disclaimer, the term of this patent is extended or adjusted under 35 U.S.C. 154(b) by 0 days.

(21) Appl. No.: 13/453,634

(22) Filed: Apr. 23, 2012

(65) Prior Publication Data

US 2012/0205573 A1 Aug. 16, 2012

Related U.S. Application Data

(63) Continuation of application No. 12/509,817, filed on Jul. 27, 2009.

(30) Foreign Application Priority Data

Jul. 30, 2008 (JP) .................................. 2008-195950

(51) Int. Cl.
*H02K 1/02* (2006.01)
*H02K 1/27* (2006.01)
*H02K 21/12* (2006.01)

(52) U.S. Cl. .............. 310/156.01; 310/156.53; 148/301; 148/302

(58) Field of Classification Search ............. 310/156.01, 310/156.53, 156.83, 156.84; *H02K 1/02, H02K 1/27, 21/12, 21/14*
See application file for complete search history.

(56) References Cited

U.S. PATENT DOCUMENTS

| 5,858,124 | A * | 1/1999 | Endo et al. ..................... 148/302 |
| 7,800,271 | B2 * | 9/2010 | Komuro et al. ........... 310/156.53 |
| 7,880,357 | B2 * | 2/2011 | Suzuki et al. ............. 310/156.53 |
| 2003/0136469 | A1 * | 7/2003 | Makita et al. ................. 148/302 |
| 2005/0081959 | A1 | 4/2005 | Kim et al. |
| 2007/0071979 | A1 | 3/2007 | Komuro et al. |

(Continued)

FOREIGN PATENT DOCUMENTS

JP 2003-282312 A 10/2003

(Continued)

OTHER PUBLICATIONS

Japanese Office Action dated Aug. 17, 2010 (Two (2) pages).

(Continued)

*Primary Examiner* — Quyen Leung
*Assistant Examiner* — Michael Andrews
(74) *Attorney, Agent, or Firm* — Crowell & Moring LLP

(57) ABSTRACT

An R—Fe—B sintered magnet has a structure including main phase crystal grains and a grain boundary area surrounding the crystal grains. The sintered magnet includes fluorine and a specified metal element selected from elements belonging to Group 2 through Group 16 of periodic table excepting the rare earth element, carbon and boron. The fluorine has a higher concentration in a region closer to a magnet surface than in the center. The specified element also has a higher concentration in the region closer to the surface. The sintered magnet includes oxyfluoride containing carbon, Dy and the metal element in a grain boundary area region at a distance of 1 μm or greater from the magnet surface, and the carbon has a higher concentration than the concentration of the metal element in a region at a distance of 1 μm to 500 μm from the magnet surface.

6 Claims, 9 Drawing Sheets

U.S. PATENT DOCUMENTS

| | | |
|---|---|---|
| 2008/0054738 A1 | 3/2008 | Komuro et al. |
| 2010/0141367 A1 | 6/2010 | Komuro et al. |
| 2012/0025651 A1* | 2/2012 | Komuro et al. ............... 310/152 |

FOREIGN PATENT DOCUMENTS

| | | |
|---|---|---|
| JP | 2006-303433 A | 11/2006 |
| JP | 2006-303434 A | 11/2006 |
| JP | 2006-303435 A | 11/2006 |
| JP | 2006-303436 A | 11/2006 |
| JP | 2007-116088 A | 5/2007 |
| JP | 2007-116142 A | 5/2007 |
| JP | 2008-60183 A | 3/2008 |

OTHER PUBLICATIONS

Nakamura, H. et al., "Magnetic Properties of Extremely Small Nd-Fe-B Sintered Magnets", IEEE Transaction on Magnetics, Oct. 2005, pp. 3844-3846, vol. 41, No. 10.

* cited by examiner

ROTATING MACHINE WITH SINTERED MAGNET AND METHOD FOR PRODUCING SINTERED MAGNET

CROSS-REFERENCE TO RELATED APPLICATIONS

This application is a continuation of application Ser. No. 12/509,817, filed Jul. 27, 2009, which claims priority under 35 U.S.C. §119 to Japanese Patent Application No. JP 2008-195950, filed Jul. 30, 2008. The disclosure of Japanese Patent Application No. JP 2008-195950, filed Jul. 30, 2008, to which a claim to priority is made in this application is herein incorporated by reference.

BACKGROUND OF THE INVENTION

1. Field of the Invention

The present invention relates to a rotating machine with a rare earth sintered magnet and a method for producing a sintered magnet. More particularly to a sintered magnet with reduced amounts of heavy rare earth elements yet having a high energy product or high heat resistance and to a method.

2. Description of Related Art

The present invention relates to a sintered magnet and a rotating machine equipped with the sintered magnet, comprising an Fe-based magnet containing an R—Fe (where R represents a rare earth element); the sintered magnet includes a phase containing layered fluorine formed in grain boundary or within grains of the material of the Fe-based magnet in order to increase heat resistance of the Fe-based magnet containing the R—Fe, and the phase containing fluorine improves magnetic properties and reliability of the magnet. The magnet having the phase containing fluorine is used for a magnet having characteristics suitable for various types of magnetic circuits and magnet motors to which such magnets are applied. Such magnet motors include those magnet motors that are used for driving hybrid automobiles, and those magnet motors for starters and powered steering and so on in hybrid automobiles.

Conventional rare earth sintered magnets containing fluoride compounds or oxyfluoride compounds are disclosed in Patent Literature 1 (JP-A-2003-28312), Patent Literature 2 (JP-A-2006-303436), Patent Literature 3 (JP-A-2006-303435), Patent Literature 4 (JP-A-2006-303434), and Patent Literature 5 (JP-A-2006-303433). In the above-mentioned conventional technologies, the fluoride compounds used for processing are in the form of powder or mixtures of powder of respective compounds and a solvent, and it is difficult to efficiently form a phase containing fluorine along surfaces of magnetic particles. In the above-mentioned conventional methods, the fluoride compounds or oxyfluoride compounds used for the processing are in point contact with the surfaces of the magnetic particles, and it is difficult for the phase containing fluorine to come in surface contact with the magnetic particles unlike the method of the present invention. Therefore, there have been required a relatively large amount of the processing material and heat treatment at high temperatures according to the conventional methods. Patent Literature 6 (US2005/0081959A1) discloses a mixture of fine particles (1 to 20 μm) of a rare earth fluoride compound with Nd—Fe—B powder. However, it discloses no examples in which the Nd—Fe—B particles are grown such that they are discretely distributed in the form of plates. As described in Non-Patent Literature 1 (IEEE TRANSACTIONS ON MAGNETICS and VOL. 41 No. 10 (2005) Page 3844), fine particles (1 to 5 μm) of $DyF_3$ or $TbF_3$ are coated on the surface of a minute sintered magnet. This is done by a treatment other than the treatment with a solution of the fluoride compound but Dy and F are absorbed by the sintered magnet to form NdOF and Nd oxide. However, there is no description on the relationship between the concentration gradients of carbon, heavy rare earth, and light rare earth and the anisotropic direction of the magnet.

[Patent Literature 1] JP-A-2003-282312
[Patent Literature 2] JP-A-2006-303436
[Patent Literature 3] JP-A-2006-303435
[Patent Literature 4] JP-A-2006-303434
[Patent Literature 5] JP-A-2006-303433
[Patent Literature 6] US2005/0081959
[Non-Patent Literature 1] IEEE TRANSACTIONS ON MAGNETICS and VOL. 41 No. 10 (2005) Page 3844

SUMMARY OF THE INVENTION

The conventional technology uses pulverized powder of a fluoride compound and so on as a material in order to form a phase containing fluorine in the form of layers in Nd—Fe—B magnetic particles and hence there is no description on the state of a low viscosity transparent solution. Therefore, a high heat treatment temperature is required for diffusion so that it is difficult to achieve an improvement in magnetic properties and reduction of concentration of the rare earth element in magnetic particles whose magnetic properties are deteriorated at temperatures lower than that at which the sintered magnet is treated. For this reason, the conventional method performs heat treatment at high temperatures so that it uses a large amount of the fluoride compound that is required for diffusion. this makes it difficult to apply the conventional method to magnets having a thickness exceeding 10 mm because there is a tendency that the concentrations of heavy rare earth elements and/or fluorine are decreased from the surface of the magnet toward the inside thereof.

In view of the above-mentioned problem, the present invention has for its object to reduce the amount of the fluoride compound and prevent deterioration of the magnetic properties of the magnetic powder material by heat treatment.

In order to achieve the object, the present invention provides a rotating machine equipped with a sintered magnet, the sintered magnet comprising: a ferromagnetic material consisting mainly of iron, a rare earth element, and a half-metallic element; a fluoride compound or an oxyfluoride compound formed inside crystal grains or in a portion of grain boundary area of the ferromagnetic material; at least one element selected from the group consisting of alkalis, alkaline earth elements, metal elements, and rare earth elements and carbon or nitrogen contained in the fluoride compound or the oxyfluoride compound; and a continuously extending layer formed by the fluoride compound or the oxyfluoride, the continuously extending layer extending from a surface of the ferromagnetic material through the inside of the ferromagnetic material to an opposite side surface of the ferromagnetic material, wherein the at least one element selected from the group consisting of alkalis, alkaline earth elements, metal elements, and rare earth elements segregates in an outer peripheral portion within the grain along the continuously extending layer and along the grain boundary of the ferromagnetic material, and grains of the fluoride compound or the oxyfluoride compound are formed, there are present in a portion of the grains of the fluoride compound or the oxyfluoride compound a gradient of concentration in which the at least one element selected from the group consisting of alkalis, alkaline earth elements, metal elements, half-metallic elements, and rare earth elements is in an increasing concentration from a center of the grain toward an outer side of the grain in a portion of the grains of the fluoride compound or the oxyfluoride compound, and an average concentration of at least one element selected from the group consisting of fluorine, rare earth element, or carbon measured over an area not smaller than 100 μm² is such that a ratio of a value measured in an area within a depth of 100 μm from an outermost surface of the ferromagnetic material excluding a protective layer to a value measured in an area including a central part at a distance of not smaller than 100 μm from the outermost surface is 1±0.5.

According to the present invention, the amount of fluorine to be used is reduced and deterioration of magnetic properties of the magnetic powder material due to heat treatment can be prevented.

The following is a list of rotating machines equipped with sintered magnets having main characteristics subsequent to sintered magnet motors having the features of the present invention described with respect to the means for solving the above-mentioned problem.

(1) A rotating machine equipped with a sintered magnet, the sintered magnet comprising: a ferromagnetic material consisting mainly of iron; a layer of a fluoride compound or a layer of an oxyfluoride compound formed inside crystal grains or in a portion of grain boundary area of the ferromagnetic material; at least one element selected from the group consisting of alkalis, alkaline earth elements, and rare earth elements and carbon contained in the layer of the fluoride compound or the layer of the oxyfluoride compound; and a continuously extending layer formed by a portion of the layer of the fluoride compound or the layer of the oxyfluoride layer, the continuously extending layer extending from a surface of the ferromagnetic material through the inside of the ferromagnetic material to an opposite side surface of the ferromagnetic material, wherein a ratio of an average concentration of fluorine in an area within 100 μm from the surface of the ferromagnetic material to an average concentration of fluorine in an area including a central part at a distance of at least 100 μm is in the range of 1±0.5, and a concentration gradient of the rare earth elements is present in a matrix near the grain boundary of the ferromagnetic material.

(2) A rotating machine equipped with a sintered magnet, the sintered magnet comprising: a ferromagnetic material consisting mainly of iron and a rare earth element; a fluoride compound or an oxyfluoride compound formed inside crystal grains or in a portion of grain boundary area of the ferromagnetic material; at least one element selected from the group consisting of alkalis, alkaline earth elements, metal elements, and rare earth elements and carbon contained in the fluoride compound or the oxyfluoride compound; and a continuously extending layer formed by a portion of the fluoride compound or the oxyfluoride, the continuously extending layer extending from a surface of the ferromagnetic material through the inside of the ferromagnetic material to an opposite side surface of the ferromagnetic material, wherein the at least one element selected from the group consisting of alkaline earth elements, metal elements, and rare earth elements segregates along the continuously extending layer, and the at least one element selected from the group consisting of alkalis, alkaline earth elements, metal elements, and rare earth elements segregates inside grains of the fluoride compound or the oxyfluoride compound.

(3) A rotating machine equipped with a sintered magnet, the sintered magnet comprising: a ferromagnetic material consisting mainly of iron and a rare earth element; a fluoride compound or an oxyfluoride compound formed inside crystal grains or in a portion of grain boundary area of the ferromagnetic material; at least one element selected from the group consisting of alkalis, alkaline earth elements, metal elements, and rare earth elements and carbon contained in the fluoride compound or the oxyfluoride compound; and a continuously extending layer formed by the fluoride compound or the oxyfluoride, the continuously extending layer extending from a surface of the ferromagnetic material through the inside of the ferromagnetic material to an opposite side surface of the ferromagnetic material, wherein the at least one element selected from the group consisting of alkalis, alkaline earth elements, metal elements, and rare earth elements segregates along the continuously extending layer and along the grain boundary of the ferromagnetic material, and grains of the fluoride compound or the oxyfluoride compound are formed, the at least one element selected from the group consisting of alkalis alkaline earth elements, metal elements, and rare earth elements segregates in an increasing concentration from a center of the grain toward outside thereof in a portion of the grains of the fluoride compound or the oxyfluoride compound, and an average concentration of fluorine or carbon measured over an area not smaller than 100 μm² is such that a ratio of a value measured in an area within 100 μm from an outermost surface of the ferromagnetic material to a value measured in an area including a central part at a distance of not smaller than 100 μm from the outermost surface is 1±0.5.

(4) A rotating machine equipped with a sintered magnet, the sintered magnet comprising: a ferromagnetic material consisting mainly of iron and a rare earth element; at least one element selected from the group consisting of alkalis, alkaline earth elements, metal elements, and rare earth elements and carbon contained in the fluoride compound or the oxyfluoride compound; and a continuously extending layer formed by the fluoride compound or the oxyfluoride, the continuously extending layer extending in a grain boundary at any locus of the ferromagnetic material without being connected to an outermost surface of the ferromagnetic material, wherein the at least one element selected from the group consisting of alkalis, alkaline earth elements, metal elements, and rare earth elements segregates along the continuously extending layer and along a grain boundary of a matrix of the ferromagnetic material, and the at least one element selected from the group consisting of alkalis, alkaline earth elements, metal elements, and rare earth elements segregates within grains of the fluoride compound or the oxyfluoride compound having a crystal structure with n-fold symmetry in an increasing concentration from a center of the grain toward outside thereof.

(5) A rotating machine equipped with a sintered magnet, the sintered magnet comprising: a ferromagnetic material consisting mainly of iron and a rare earth element; a fluoride compound or an oxyfluoride compound formed inside crystal grains or in a portion of grain boundary area of the ferromagnetic material; at least one element selected from the group consisting of alkalis, alkaline earth elements, metal elements, and rare earth elements and carbon contained in the fluoride compound or the oxyfluoride compound; and a continuously extending layer formed by the fluoride compound or the oxyfluoride, the continuously extending layer extending from a surface of the ferromagnetic material through the inside of the ferromagnetic material to an opposite side surface of the ferromagnetic material, wherein the at least one element selected from the group consisting of alkalis, alkaline earth elements, metal elements, and rare earth elements segregates in an outer peripheral portion within the grain along the continuously extending layer and along the grain boundary of the ferromagnetic material, and grains of the fluoride compound or the oxyfluoride compound are formed, there are present in a portion of the grains of the fluoride compound or the oxyfluoride compound a gradient of concentration in which the at least one element selected from the group consisting of alkalis alkaline earth elements, metal elements, and rare earth elements is in an increasing concentration from a center of the grain toward an outer side of the grain and a gradient of concentration in which the at least one element selected from the group consisting of alkalis alkaline earth elements, metal elements, and rare earth elements is in a decreasing concentration from a center of the grain toward the outer side of the grain in a portion of the grains of the fluoride compound or the oxyfluoride compound, and an average concentration of fluorine or carbon measured over an area not smaller than 100 μm² is such that a ratio of a value measured in an area within 100 μm from an outermost surface of the ferromagnetic material to a value measured in an area including a central part at a distance of not smaller than 100 μm from the outermost surface is 1±0.5.

(6) A rotating machine equipped with a sintered magnet, the sintered magnet comprising: a ferromagnetic material consisting mainly of iron and a rare earth element; a fluoride compound or an oxyfluoride compound formed inside crystal grains or in a portion of grain boundary area of the ferromagnetic material; at least one element selected from the group consisting of alkalis, alkaline earth elements, metal elements, and rare earth elements and carbon contained in the fluoride compound or the oxyfluoride compound; and a continuously extending layer formed by the fluoride compound or the oxyfluoride, the continuously extending layer extending in a grain boundary at any locus of the ferromagnetic material without being connected to an outermost surface of the ferromagnetic material, wherein the at least one element selected from the group consisting of alkalis, alkaline earth elements, metal elements, and rare earth elements segregates along the continuously extending layer and along a grain boundary of a matrix of the ferromagnetic material, and the at least one element selected from the group consisting of alkalis, alkaline earth elements, metal elements, and rare earth elements segregates within grains of the fluoride compound or the oxyfluoride compound having a cubic crystal structure in an increasing concentration from a center of the grain toward outer side thereof.

(7) A rotating machine equipped with a sintered magnet, the sintered magnet comprising: a ferromagnetic material consisting mainly of iron, a rare earth element, and a half-metallic element; a fluoride compound or an oxyfluoride compound formed inside crystal grains or in a portion of grain boundary area of the ferromagnetic material; at least one element selected from the group consisting of alkalis, alkaline earth elements, metal elements, and rare earth elements and carbon or nitrogen contained in the fluoride compound or the oxyfluoride compound; and a continuously extending layer formed by the fluoride compound or the oxyfluoride, the continuously extending layer extending in a grain boundary at any locus of the ferromagnetic material so as to surround one or more crystal grains without being connected to an outermost surface of the ferromagnetic material, wherein the at least one element selected from the group consisting of alkalis, alkaline earth elements, metal elements, and rare earth elements segregates along the continuously extending layer and along a grain boundary of a matrix of the ferromagnetic material, and the at least one element selected from the group consisting of alkalis, alkaline earth elements, metal elements, and rare earth elements segregates within grains of the fluoride compound or the oxyfluoride compound having a structure of a cubic, hexagonal, or tetragonal crystal in an increasing concentration from a center of the grain toward outside thereof.

(8) A rotating machine equipped with a sintered magnet, the sintered magnet comprising: a ferromagnetic material consisting mainly of iron, a rare earth element, and a half-metallic element; a fluoride compound or an oxyfluoride compound formed inside crystal grains or in a portion of grain boundary area of the ferromagnetic material; at least one element selected from the group consisting of alkalis, alkaline earth elements, metal elements, and rare earth elements and carbon or nitrogen contained in the fluoride compound or the oxyfluoride compound; and a continuously extending layer formed by the fluoride compound or the oxyfluoride, the continuously extending layer extending in a grain boundary at any locus of the ferromagnetic material so as to surround one or more crystal grains without being connected to an outermost surface of the ferromagnetic material, wherein the at least one element selected from the group consisting of alkalis, alkaline earth elements, metal elements, and rare earth elements segregates along the continuously extending layer and along a grain boundary of a matrix of the ferromagnetic material in a concentration higher than that in a center of the grain boundary, and the at least one element selected from the group consisting of alkalis, alkaline earth elements, metal elements, and rare earth elements segregates within grains of the fluoride compound or the oxyfluoride compound having a symmetry of a cubic, hexagonal, or tetragonal crystal in an increasing concentration from a center of the grain toward outside thereof.

(9) A method for producing a sintered magnet for producing the sintered magnet of the rotating machine according to (1) to (6) above, the method comprising: molding the ferromagnetic material to form a preform of a magnet; and impregnating or coating the preform with the fluoride compound or the oxyfluoride compound dissolved in a solution having optical transparency or low viscosity and then sintering the impregnated or coated preform.

Thus, in the present invention, there is adopted a step of impregnating a solution of a fluoride compound in gaps between magnetic particles of a preform after orientation in a magnetic field using sol-state rare earth fluoride or alkaline earth metal fluoride swelled with a solvent consisting mainly of alcohol as a treating solution or a step of mixing magnetic particles with those coated with the fluoride compound by surface treatment and then preforming the resultant in a magnetic field. As a result, there is provided a sintered magnet that allows the fluoride compound to be formed inside the sintered magnet more readily than the case where powder of pulverized fluoride compound is used and makes it possible for fluorine or rare earth element to diffuse for segregation at low temperatures.

DETAILED DESCRIPTION OF THE INVENTION

Figure 1:
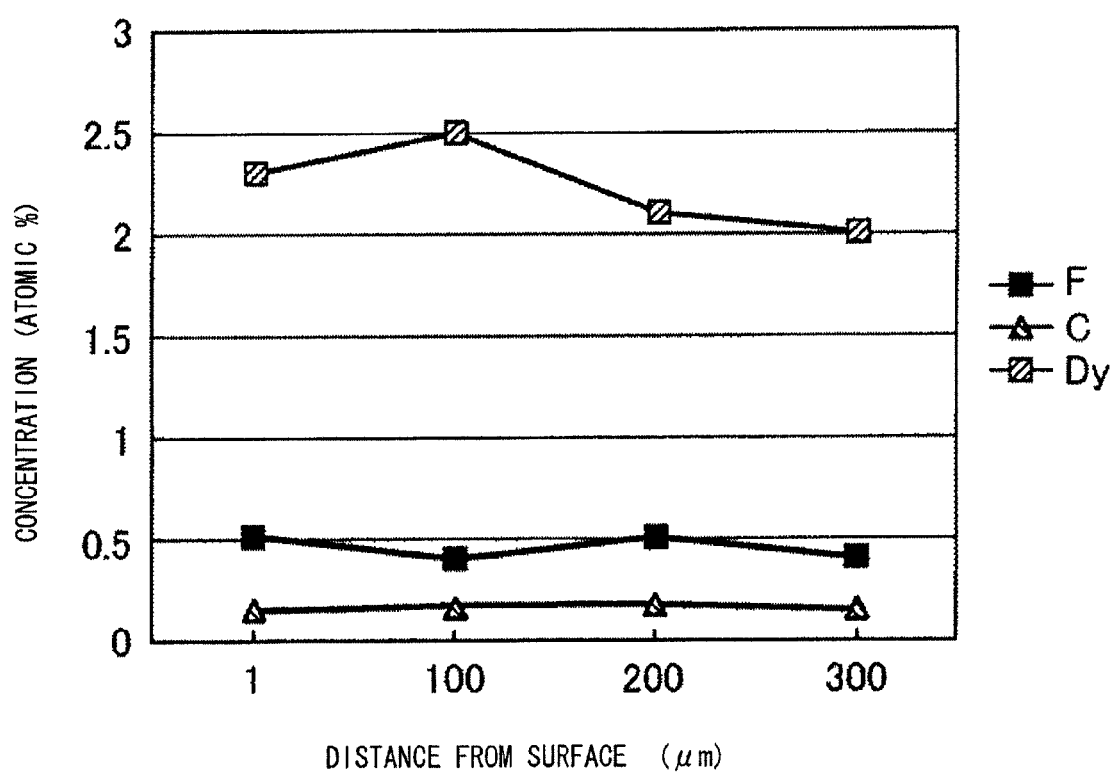
FIG. 1 shows an example of concentration distribution on a cross-section of a first example of a sintered magnet according to the present invention.

An outline of the method for achieving the object of the present invention will be described below before embodiments of the present invention are explained.

In order to achieve the above-mentioned object, two methods are available. Both of them use a fluoride compound-based solution that contains no pulverized particles and is light-transmissive. Such a solution is impregnated to a low density compact with gaps and then the impregnated compact is sintered. Alternatively, surface-treated magnetic particles coated with a fluoride compound on the surface thereof are mixed with non-treated magnetic particles and then the mixture is preformed and sintered. When a sintered magnet with a main phase of $Nd_2Fe_{14}B$ is to be fabricated, the particle size of magnetic particles is adjusted so as to have an appropriate particle size distribution and then preformed in a magnetic field. The preform has gaps between the magnetic particles therein, so that the preform can be coated up to the central part thereof with the fluoride compound solution by impregnating the solution into the gaps. On this occasion, it is preferred that the fluoride compound solution is a highly transparent solution, a light-transmissive solution, or a solution that has a low viscosity. By using such a solution, the fluoride compound solution can be introduced into minute gaps between the magnetic particles. The impregnation can be achieved by contacting a part of the preform with the fluoride compound solution. The fluoride compound solution is coated along the surfaces where the preform and the fluoride compound solution contact each other. If the coated surface has gaps of dimension of 1 nm to 1 mm, the fluoride compound solution is impregnated along the surface of the magnetic particles within the gap. The direction of impregnation is a direction in which a continuous penetrating gap of the preform is present, which depends on the preforming conditions and the shape of the magnetic particles. Since coating amount of the fluoride compound solution differs between the contact surface of the fluoride compound solution for impregnation and in the vicinity of non-contact surface, there may be a difference in concentration in a portion of elements that constitute the fluoride compound after sintering. Also, there may be a difference in distribution of concentration of the fluoride compound on average between the surface at which the solution contacts and a surface vertical thereto. The fluoride compound solution is a solution of a fluoride compound or a fluoride oxide compound that partially contains oxygen (hereafter, referred to as "oxyfluoride compound"), which contains at least one of alkali metal elements, alkaline earth metal elements, or rare earth elements and carbon having a structure similar to that of amorphous carbon. The impregnation treatment can be performed at room temperature. The impregnated solution is heat treated at 200° C. to 400° C. to remove the solvent and further heat treatment performed at 500° C. to 800° C. results in diffusion of carbon, rare earth elements and elements that constitute the fluoride compound in between the fluoride compound and the magnetic particles as well as grain boundaries. The magnetic particles include oxygen in a concentration of 10 to 5,000 ppm. Other impurity elements include light elements such as H, C, P, Si, and Al or transition metal elements. The oxygen included in the magnetic particles exists in the forms of not only rare earth oxides and oxides of light elements such as Si and Al but also in the form of oxygen-containing phases that have compositions that are deviated from the stoichiometric composition in the parent phase or matrix. Such oxygen-containing phases reduce the magnetization of the magnetic particles and affect the shape of the magnetization curve. Specifically, these lead to a decrease in residual magnetic flux density, a decrease in anisotropic magnetic field, a decrease in squareness of demagnetization curve, a decrease in coercivity, an increase in irreversible demagnetizing factor, an increase in heat demagnetization, variation in magnetizing characteristics, deterioration of anticorrosion, a reduction in mechanical characteristics, and so on. Therefore, the reliability of the magnet is decreased. Since oxygen affects many characteristics as mentioned above, processes for preventing oxygen from remaining in the magnetic particles have been studied. The rare earth fluoride compound that is impregnated and grown on the surface of the magnetic particles, which contains a solvent in some portions thereof, is subjected to heat treatment at 400° C. or lower to allow $REF_3$ (RE represents a rare earth element) to grow and retained under heating at 400 to 800° C. at a vacuum degree of $1 \times 10^{-3}$ Torr. The retention time is 30 minutes. The diffusion heat treatment effects diffusion of iron atoms in the magnetic particles and rare earth elements, and oxygen into the fluorine compound so as to appear in $REF_3$, $REF_2$ or RE (OF), or grain boundaries of these compounds. Since the impregnation occurs along the gap penetrating from the surface of the formed body, so that a grain boundary phase containing fluorine is formed in the magnet after sintering as a continuous layer extending from one surface area to another surface area therethrough. By using the above-mentioned treating solution, the fluoride compound can be diffused into the inside of the magnetic body and sinter it at a relative low temperature in the range of 200 to 1,000° C. The impregnation has the following advantages. 1) The amount of fluoride compound required for the treatment can be decreased. 2) Sintered magnets having a thickness of 10 mm or more can be treated. 3) The temperature at which the fluoride compound is diffused can be lowered. 4) Heat treatment for diffusion after sintering is unnecessary. From these features, there are obtained conspicuous effects such as an increase in remnant flux density, an increase in coercivity, an improvement in squareness of demagnetization curve, an improvement in heat demagnetization properties, an improvement in magnetization properties, an improvement in anisotropic magnetic field, an improvement in anticorrosion, a reduction in loss, an improvement in mechanical strength, and a reduction in production cost. When the magnetic particles are based on Nd—Fe—B, Nd, Fe, B or additive elements, or impurity elements will diffuse in the fluorine compound at a heating temperature of 200° C. or higher. At the above-mentioned temperature, the concentration of fluorine in the fluoride compound layer differs from place to place and $REF_2$, $REF_3$ (RE represents a rare earth element), or oxyfluorides thereof are formed discontinuously in the form of layers or plates. On the other hand, a continuous fluoride layer is formed in the direction in which impregnation proceeds to provide a continuous layer that extends from one surface area to another surface area on the opposite side. The diffusion is driven by temperature, stress (strain), difference in concentration, defects and so on. Results of diffusion can be observed using an electron microscope or the like. By impregnation with a solution containing no pulverized particles of the fluoride compound, the fluoride compound can be already formed in the center of the preform even at room temperature, so that diffusion can be achieved at low temperatures. Therefore, the amount of the fluoride compound can be minimized. In particular, this method is effective in the case of Nd—Fe—B magnetic particles whose magnetic properties are deteriorated at high temperatures. The Nd—Fe—B magnetic powder includes magnetic particles containing a phase having a crystal structure equivalent to that of $Nd_2Fe_{14}B$ in the main phase. The main phase may contain transition metals elements such as Al, Co, Cu, Ti, etc. A portion of B may be substituted by C. Compounds such as $Fe_3B$ or $Nd_2Fe_{23}B_3$, etc or oxides corresponding to them may be contained in a layer other than the main phase. Since the fluoride compound layer exhibits resistance higher than that of Nd—Fe—B magnetic powder at 800° C. or lower, it is possible to increase resistance of the Nd—Fe—B sintered magnet by forming the fluoride compound layer so that the loss can be reduced. The fluoride compound layer may contain besides the fluoride compound such impurities that have little influence on magnetic properties and exhibit no ferromagnetism at around room temperature. In order to obtain a high resistance or improve the magnetic properties, the fluoride compound may contain fine particles of nitrides or carbides. The sintered magnet in which the fluoride compound is formed by impregnation process includes a continuous layer of the fluoride compound that extends from one surface area to another surface area of the magnet or a grain boundary in the form of layers that contain fluorine but remain inside the magnet without reaching the surface of the magnet. Such magnets can be fabricated with reduced amounts of heavy rare earth elements. Therefore, the sintered magnets with high energy product can be manufactured, and they can be applied to high torque rotating machines.

FIRST EMBODIMENT

Magnetic particles consisting mainly of $Nd_2Fe_{14}B$ structure are prepared as an Nd—Fe—B series magnetic powder. A fluoride compound is formed on the surface of the magnetic particles. When $DyF_3$ is formed on the surface of the magnetic particles, $Dy(CH_3COO)_3$ as a material is dissolved in $H_2O$ and HF is added to the solution. Addition of HF results in formation of gelatinous $DyF_3.XH_2O$ or $DyF_3.X(CH_3COO)$ (X is a positive number). It is centrifuged to remove the solvent and made into a solution with optical transparency. The magnetic particles are charged in a mold and pressed at a load of 1 t/cm² in a magnetic field of 10 kOe to prepare a preformed body. The preformed body has continuous gaps. The preformed body is dipped in the solution with optical transparency only at a bottom surface thereof. The bottom surface is a plane parallel to the direction of the magnetic field. The solution enters the preformed body through the bottom surface and side surfaces thereof and the solution with optical transparency is coated in the surface of the magnetic particles. Then, the solvent in the solution with optical transparency is evaporated. Then, after hydrated water is evaporated by heating, the magnetic particles are performed at about 1,100° C. At the time of sintering, Dy, C, and F that constitute the fluoride compound are diffused along the surface and grain boundary of the magnetic particles. There occur mutual diffusion in which Dy, C, and F are exchanged with Nd and Fe that constitute the magnetic particles. In particular, diffusion in which Dy is exchanged by Nd proceeds in the vicinity of the grain boundary to form a structure in which Dy is segregated along the grain boundary. In grain boundary triple areas, oxyfluoride compounds and fluoride compounds are formed. The grain boundary triple areas are constituted by $DyF_3$, $DyF_2$, DyOF and so on. A sintered magnet of a size of 10×10×10 mm is prepared by the above-mentioned process and a cross-section of the sintered magnet is analyzed by wavelength dispersive X-ray spectroscopy. As a result, it reveals that a ratio of an average concentration of fluorine for an area including the surface to a depth of 100 μm to an average concentration of fluorine for an area near the center of the magnet to a depth of 4 mm or more is determined at 10 different places each in an area of 100×100 As a result, a ratio of 1.0±0.5 is obtained. The obtained sintered magnet, compared to the case where no fluoride compound is used, exhibits an increase in coercive force by 40%, a decrease in remnant flux density by 2%, and an increase in Hk by 10%. The fluoride compound-impregnated sintered magnet manifests a high energy product so that it can be applied to a hybrid rotating machine for automobiles.

SECOND EMBODIMENT

Magnetic particles with an average particle diameter of 5 μm consisting mainly of $Nd_2Fe_{14}B$ and containing about 1% boride and a rare earth-rich phase are prepared as an Nd—Fe—B series magnetic powder. A fluoride compound is formed on the surface of the magnetic particles. When $DyF_3$ is formed on the surface of the magnetic particles, $Dy(CH_3COO)_3$ as a material is dissolved in $H_2O$ and HF is added to the solution. Addition of HF results in formation of gelatinous $DyF_3.XH_2O$ or $DyF_3.X(CH_3COO)$ (X is a positive number). It is centrifuged to remove the solvent and made into a solution with optical transparency. The magnetic particles are charged in a mold and pressed at a load of 1 t/cm² in a magnetic field of 10 kOe to prepare a preformed body. The density of the preformed body is about 60%. The preformed body has continuous gaps extending from a bottom surface to a top surface of the preformed body. The preformed body is dipped in the solution with optical transparency only at the bottom surface thereof. The bottom surface is a plane parallel to the direction of the magnetic field. The solution starts to enter the gaps between the magnetic particles. By evacuation, the solution with optical transparency is impregnated on the surface of the magnetic particles in the gaps between the magnetic particles, and exudes at a surface other than the bottom surface of the preformed body. Then, the solvent of the solution with optical transparency is evaporated along the continuous gaps, the hydrated water is evaporated by heating, and the preformed is sintered by holding it in a vacuum oven at a temperature of about 1,100° C. for 3 hours. At the time of sintering, Dy, C, and F that constitute the fluoride compound are diffused along the surface and grain boundary of the magnetic particles. There occurs mutual diffusion in which Dy, D, and F are exchanged with Nd and Fe that constitute the magnetic particles. In particular, diffusion in which Dy is exchanged by Nd proceeds in the vicinity of the grain boundary to form a structure in which Dy is segregated along the grain boundary. In grain boundary triple areas and grain boundary, particles of the oxyfluoride compound and the fluoride compound are formed, which are constituted by $DyF_3$, $DyF_2$, DyOF, NdOF, $NdF_2$, $NdF_3$ and so on. It is confirmed by TEM-EDX (electron microscope, energy dispersive X-ray) using electron beam of 2 nm in diameter that in some particles, the concentrations of Dy and fluorine are at high levels from within the particles over the grain boundary. In the central part of the grain boundary, there are detected fluorine atoms and Dy is concentrated in a range of on average 1 nm to 500 nm from the central part of the grain boundary. In the vicinity of the Dy-concentrated portion, there is observed an area in which the concentration of Dy is decreased from the center of the crystal grain toward the grain boundary, and Dy atoms added in advance to within the particles are diffused in the vicinity of the grain boundary. As a result, there is observed a gradient of concentration such that the concentration of Dy from the center of the grain toward the grain boundary is once decreased and then increased in the vicinity of the grain boundary. The concentration of Dy as a ratio (Dy/Nd) to that of Nd at a distance of 100 nm from the center of the grain boundary is 1/2 to 1/10. Such a sintered magnet, as compared with the case where no fluoride compound is used, exhibits an increase in coercive force by 40%, a decrease in remnant flux density by 2%, and an increase in Hk by 10%. The fluoride compound-impregnated sintered magnet manifests a high energy product so that it can be applied to a hybrid rotating machine for automobiles.

THIRD EMBODIMENT

The DyF-based treating solution is prepared by dissolving Dy acetate in water and gradually adding dilute hydrofluoric acid to the resultant solution. The resultant solution containing gel-like precipitation of a fluoride compound in admixture with an oxyfluoride compound or an oxyfluoride carbide compound is stirred using an ultrasonic agitator. After centrifugation, methanol is added to the sediments to obtain a gel-like methanol solution, which then is stirred and anions are removed therefrom to make the solution transparent. The obtained treating solution is made free of negative ions so that it has a light transmission of 5% or more for visible light. This solution is impregnated to the preformed body. The preformed body is fabricated by pressing $Nd_2Fe_{14}B$ magnetic particles at a load of 5 t/cm$^2$ in a magnetic field of 10 kOe so as to have a thickness of 20 mm and an average density of 60%. Thus, the preformed body does not have a density of 100% and accordingly there are continuous gaps within the preformed body. The above-mentioned solution is impregnated into the gaps. The preformed body is made contact with the solution with a surface perpendicular to the direction along which the magnetic field is applied being defined as a bottom surface to allow the solution to be infiltrated in the gaps between the magnetic particles. On this occasion, evacuation allows the solution to be impregnated along the gaps and coated on a surface opposite to the bottom surface. The impregnated preformed body is heated at 200° C. under vacuum to evaporate the solvent of the coating solution. The impregnated preformed body after the evaporation of the coating solution is placed in a vacuum heat treatment oven and heated under vacuum to a sintering temperature of 1,000° C. to effect sintering and obtain an anisotropic sintered magnet having a density of 99%. As compared with a magnet fabricated without the impregnation treatment, the sintered magnet with impregnation treatment with the DyF-based treating solution has a feature that it includes Dy segregated near the grain boundary and contains F, Nd, and oxygen in large amounts at the grain boundary even in the center of the magnet. Due to the Dy that is present near the grain boundary, coercive force is increased. Thus, the Dy-impregnated sintered magnet exhibits characteristics of a coercive force of 25 kOe and a residual magnetic flux density of 1.5 T at 20° C. The concentrations of Dy and F are higher at portions of the sintered magnet that served as paths of the impregnation than other portions and thus there exist differences in concentration of Dy and F. Continuous fluoride formation occurs in the direction along the line from the side soaked in the impregnation liquid to the side opposite thereto. This can be confirmed with SEM-EDX, TEM-EDX or EELS and EPMA. Analysis of average concentration of fluorine on a surface of 100 µm square, indicates that the ratio of the average concentration on the surface of the magnet to that of the central portion of the magnet is 1±0.5. The ratios of average concentrations of elements other than fluorine, such as Dy, C, or Nd are each 1±0.5.

The impregnation treatment with DyF-based liquid and sintering can provide, in addition to the improvements in the above-mentioned characteristics, at least one of various advantageous effects including an improvement in squareness of magnetic properties, an increase in resistance after molding, a decrease in dependence of coercive force on temperature, a decrease in dependence of residual magnetic flux density on temperature, an improvement in corrosion resistance, an increase in mechanical strength, an improvement in heat conductivity, and an improvement in adhesion of magnet. Examples of the fluoride compounds that can be applied to impregnation process include, besides $DyF_3$ from the DyF-based fluoride compounds, LiF, $MgF_2$, $CaF_2$, $ScF_3$, $VF_2$, $VF_3$, $CrF_2$, $CrF_3$, $MnF_2$, $MnF_3$, $FeF_2$, $FeF_3$, $CoF_2$, $CoF_3$, $NiF_2$, $ZnF_2$, $AlF_3$, $GaF_3$, $SrF_2$, $YF_3$, $ZrF_3$, $NbF_5$, $AgF$, $InF_3$, $SnF_2$, $SnF_4$, $BaF_2$, $LaF_2$, $LaF_3$, $CeF_2$, $CeF_3$, $PrF_2$, $PrF_3$, $NdF_2$, $SmF_2$, $SmF_3$, $EuF_2$, $EuF_3$, $GdF_3$, $TbF_3$, $TbF_4$, $DyF_2$, $NdF_3$, $HoF_2$, $HoF_3$, $ErF_2$, $ErF_3$, $TmF_2$, $TmF_3$, $YbF_2$, $YbF_3$, $LuF_2$, $LuF_3$, $PbF_2$, and $BiF_3$. The fluoride compounds also include compounds that contain any one of the above-mentioned fluoride compounds and at least one of oxygen, carbon and transition metal elements. These fluoride compounds can be formed by impregnation treatment with a solution or liquid that is transmissive to visible light or a liquid whose solvent is composed of a compound that contains a CH group to which a portion of fluorine is connected. Thus, there is formed a continuous layer containing fluorine that extends from a surface to the central part of the magnet or from one surface to another opposite thereto of the magnet. As a result of the impregnation treatment with one or more of the above-mentioned fluorine compounds, the fluoride compound(s) or the oxyfluoride compound(s) in the form of plates are observed in the grain boundary and inside the particles.

FOURTH EMBODIMENT

The DyF-based treating solution is prepared by dissolving Dy acetate in water and gradually adding dilute hydrofluoric acid to the resultant solution. The resultant solution containing gel-like precipitation of a fluoride compound in admixture with an oxyfluoride compound or an oxyfluoride carbide compound is stirred using an ultrasonic agitator. After centrifugation, methanol is added to the sediments to obtain a gel-like methanol solution, which then is stirred and anions are removed therefrom to make the solution transparent. The obtained treating solution is made free of negative ions so that it has a light transmission of 10% or more for visible light. This solution is impregnated to the preformed body. The preformed body is fabricated by pressing $Nd_2Fe_{14}B$ magnetic particles having an aspect ratio of 2 on average at a load of 5 t/cm$^2$ in a magnetic field of 10 kOe so as to have a thickness of 20 mm and an average density of 70%. The preformed body does not have a density of 100% and accordingly there are continuous gaps within the preformed body. The above-mentioned solution is impregnated into the gaps in an amount of about 1 wt %. The preformed body is made contact with the solution with a surface perpendicular to the direction along which the magnetic field is applied being defined as a bottom surface to allow the solution to be infiltrated in the gaps between the magnetic particles. On this occasion, evacuation allows the solution to be impregnated along the gaps and coated on a surface opposite to the bottom surface. The impregnated preformed body is heated at 200° C. under vacuum to evaporate the solvent of the coating solution. The impregnated preformed body after the evaporation of the coating solution is placed in a vacuum heat treatment oven and heated under vacuum to a sintering temperature of 1,000° C. to effect sintering and obtain an anisotropic sintered magnet having a density of 99%. The phase that contains Dy and F is formed as a continuous layer extending from a surface to another opposite thereto of the magnet and having a thickness of 0.5 to 5 nm except for grain boundary triple areas. As compared with a magnet fabricated without the impregnation treatment, the sintered magnet with impregnation treatment with the DyF-based treating solution has a feature that it includes Dy segregated within 500 nm near the center of the grain boundary and contains F, Nd, and oxygen in large amounts in the grain boundary. Due to the Dy that is present near the grain boundary, coercive force is increased. Thus, the Dy-impregnated sintered magnet exhibits characteristics of a coercive force of 30 kOe and a residual magnetic flux density of 1.5 T at 20° C. A sintered magnet of a size of 10×10×10 mm is prepared by the above-mentioned process and a cross-section of the sintered magnet is analyzed by wavelength dispersive X-ray spectroscopy. As a result, it reveals that a ratio of an average concentration of fluorine for an area including the surface to a depth of 100 μm to an average concentration of fluorine for an area near the center of the magnet to a depth of 4 mm or more is determined at 10 different places each in an area of 100×100 μm. As a result, a ratio of 1.0±0.3 is obtained. The obtained sintered magnet, compared to the case where no fluoride compound is used, exhibits an increase in coercive force by 40%, a decrease in remnant flux density by 0.1%, and an increase in Hk by 10%. The fluoride compound-impregnated sintered magnet manifests a high energy product so that it can be applied to a hybrid rotating machine for automobiles. The impregnation treatment with DyF-based liquid and sintering can provide, in addition to the improvements in the above-mentioned characteristics, at least one of various advantageous effects including an improvement in squareness of magnetic properties, an increase in resistance after molding, a decrease in dependence of coercive force on temperature, a decrease in dependence of residual magnetic flux density on temperature, an improvement in corrosion resistance, an increase in mechanical strength, an improvement in heat conductivity, and an improvement in adhesion of magnet. Examples of the fluoride compounds that can be applied to impregnation process include, besides $DyF_3$ from the DyF-based fluoride compounds, $LiF, MgF_2, CaF_2, ScF_3, VF_2, VF_3, CrF_2, CrF_3, MnF_2, MnF_3, FeF_2, FeF_3, CoF_2, CoF_3, NiF_2, ZnF_2, AlF_3, GaF_3, SrF_2, YF_3, ZrF_3, NbF_5, AgF, InF_3, SnF_2, SnF_4, BaF_2, LaF_2, LaF_3, CeF_2, CeF_3, PrF_2, PrF_3, NdF_2, SmF_2, SmF_3, EuF_2, EuF_3, GdF_3, TbF_3, TbF_4, DyF_2, NdF_3, HoF_2, HoF_3, ErF_2, ErF_3, TmF_2, TmF_3, YbF_2, YbF_3, LuF_2, LuF_3, PbF_2$, and $BiF_3$. The fluoride compounds also include compounds that contain any one of the above-mentioned fluoride compounds and at least one of oxygen, carbon and transition metal elements. These fluoride compounds can be formed by impregnation treatment with a solution or liquid that is transmissive to visible light or a liquid whose solvent is composed of a compound that contains a CH group to which a portion of fluorine is connected. The fluoride compound(s) or the oxy-fluoride compound(s) in the form of plates are observed in the grain boundary and inside the particles.

TABLE 1

| | Dy fluoride-segregated sintered magnet | | Nd fluoride-segregated sintered magnet | | La fluoride-segregated sintered magnet | | Pr fluoride-segregated sintered magnet | |
|---|---|---|---|---|---|---|---|---|
| | Content in DyF-based solution (Dy ratio, %) | Increase in coercive force (%) | Content in NdF-based solution (Nd ratio, %) | Increase in coercive force (%) | Content in LaF-based solution (La ratio, %) | Increase in coercive force (%) | Content in PrF-based solution (Pr ratio, %) | Increase in coercive force (%) |
| C | 10-500 (Solvent) | 2 | 10-500 (Solvent) | 3 | 10-500 (Solvent) | 5 | 0.1-30 (Solvent) | 2 |
| Mg | 0.0001-0.1 | 7 | 0.001-10.5 | 7 | 0.0001-3.5 | 7 | 0.0001-2.2 | 1 |
| Al | 0.0001-0.2 | 11 | 0.0001-15.0 | 4 | 0.0001-5.0 | 10 | 0.0001-5.0 | 7 |
| Si | 0.0001-0.05 | 10 | 0.0001-10.5 | 5 | 0.0001-5.5 | 3 | 0.0001-5.5 | 9 |
| Ca | 0.0001-1.0 | 6 | 0.0001-5.5 | 5 | 0.0001-1.0 | 6 | 0.0001-1.0 | 7 |
| Ti | 0.0001-1.0 | 7 | 0.0001-7.0 | 6 | 0.0001-2.5 | 5 | 0.0001-2.5 | 2 |
| V | 0.0001-1.0 | 9 | 0.0001-3.5 | 10 | 0.0001-1.5 | 3 | 0.0001-1.5 | 4 |
| Cr | 0.0001-1.0 | 11 | 0.0001-5.5 | 11 | 0.0001-2.0 | 5 | 0.0001-2.0 | 3 |
| Mn | 0.0001-1.0 | 17 | 0.0001-10.5 | 16 | 0.0001-5.0 | 8 | 0.0001-5.0 | 9 |
| Fe | 0.0001-1.0 | 5 | 0.0001-7.0 | 17 | 0.0001-7.0 | 5 | 0.0001-7.0 | 4 |
| Co | 0.0001-1.0 | 21 | 0.0001-20.5 | 28 | 0.0001-10.0 | 11 | 0.0001-10.0 | 8 |
| Ni | 0.0001-1.0 | 2 | 0.0001-15.5 | 12 | 0.0001-10.0 | 12 | 0.0001-10.0 | 5 |
| Cu | 0.0001-2.0 | 10 | 0.0001-10.0 | 22 | 0.0001-10.0 | 12 | 0.0001-10.0 | 11 |
| Zn | 0.0001-1.0 | 5 | 0.0001-10.0 | 14 | 0.0001-7.0 | 8 | 0.0001-7.0 | 12 |
| Ga | 0.0001-1.0 | 21 | 0.0001-15.0 | 12 | 0.0001-15.0 | 5 | 0.0001-15.0 | 13 |
| Ge | 0.0001-1.0 | 11 | 0.0001-13.5 | 11 | 0.0001-12.0 | 21 | 0.0001-12.0 | 15 |
| Sr | 0.0001-1.0 | 13 | 0.0001-3.5 | 10 | 0.0001-5.0 | 5 | 0.0001-5.0 | 3 |
| Zr | 0.0001-1.0 | 12 | 0.0001-17.5 | 8 | 0.0001-12.0 | 2 | 0.0001-12.0 | 1 |
| Nb | 0.0001-1.0 | 5 | 0.0001-15.0 | 12 | 0.0001-10.0 | 6 | 0.0001-10.0 | 7 |
| Mo | 0.0001-1.0 | 7 | 0.0001-10.8 | 6 | 0.0001-5.5 | 6 | 0.0001-5.5 | 5 |
| Pd | 0.0001-1.0 | 14 | 0.0001-25.5 | 15 | 0.0001-15.0 | 9 | 0.0001-15.0 | 5 |
| Ag | 0.0001-5.0 | 13 | 0.0001-15.5 | 25 | 0.0001-15.5 | 1 | 0.0001-15.5 | 8 |
| In | 0.0001-1.0 | 6 | 0.0001-15.5 | 12 | 0.0001-10.2 | 5 | 0.0001-10.2 | 7 |
| Sn | 0.0001-1.0 | 5 | 0.0001-4.4 | 4 | 0.0001-5.0 | 23 | 0.0001-5.0 | 9 |
| Hf | 0.0001-1.0 | 3 | 0.0001-7.5 | 6 | 0.0001-5.2 | 11 | 0.0001-5.2 | 12 |

TABLE 1-continued

| | Dy fluoride-segregated sintered magnet | | Nd fluoride-segregated sintered magnet | | La fluoride-segregated sintered magnet | | Pr fluoride-segregated sintered magnet | |
|---|---|---|---|---|---|---|---|---|
| | Content in DyF-based solution (Dy ratio, %) | Increase in coercive force (%) | Content in NdF-based solution (Nd ratio, %) | Increase in coercive force (%) | Content in LaF-based solution (La ratio, %) | Increase in coercive force (%) | Content in PrF-based solution (Pr ratio, %) | Increase in coercive force (%) |
| Ta | 0.0001-0.1 | 5 | 0.0001-8.6 | 5 | 0.0001-5.5 | 2 | 0.0001-5.5 | 5 |
| W | 0.0001-1.0 | 4 | 0.0001-12.5 | 7 | 0.0001-2.0 | 5 | 0.0001-2.0 | 3 |
| Ir | 0.0001-1.0 | 5 | 0.0001-15.5 | 13 | 0.0001-1.5 | 5 | 0.0001-1.5 | 2 |
| Pt | 0.0001-1.0 | 21 | 0.0001-25.5 | 11 | 0.0001-10.0 | 15 | 0.0001-10.0 | 9 |
| Au | 0.0001-2.0 | 15 | 0.0001-4.8 | 12 | 0.0001-8.0 | 12 | 0.0001-8.0 | 3 |
| Pb | 0.0001-1.0 | 3 | 0.0001-1.5 | 10 | 0.0001-5.0 | 6 | 0.0001-5.0 | 9 |
| Bi | 0.0001-1.0 | 18 | 0.0001-20.5 | 2 | 0.0001-10.6 | 2 | 0.0001-10.6 | 3 |

FIFTH EMBODIMENT

A series of coating compositions for forming a rare earth fluoride or alkaline earth metal fluoride coating film was prepared in the following manner.

(1) In the case of a salt having high solubility in water, for example, Dy, 4 g Dy acetate was introduced in 100 ml water, and the resultant mixture was completely dissolved by using a shaker or an ultrasonic mixer.

(2) Hydrofluoric acid diluted to 10% was gradually added to the obtained solution by an equivalent for a chemical reaction by which $DyF_x$ (where x=1 to 3) is created.

(3) The solution in which gelled $DyF_x$ (where x=1 to 3) was precipitated was stirred by an ultrasonic stirrer for 1 hour or more.

(4) After centrifuging at 4,000 to 6,000 rpm, the supernatant was removed, and approximately the same volume of methanol was added.

(5) The methanol solution including gelled DyF clusters was stirred to form a complete suspension. The suspension was stirred by an ultrasonic stirrer for one hour or more.

(6) The procedures (4) and (5) were repeated three to ten times until no anions such as acetate ions and nitrate ions were detected.

(7) Finally, in the case of DyF-based fluoride compound, almost transparent sol-like $DyF_x$ (x=1 to 3) was obtained. A 1 g/5 ml methanol solution of DyF was used as the treating solution.

(8) Each of the organometal compounds shown in Table 1 excepting carbon (C) was added to an aliquot of the above-mentioned solution.

The other coating compositions for forming rare earth fluoride or alkaline earth metal fluoride coating film can be prepared in substantially the same process as mentioned above. Addition of various elements to Dy, Nd, La or, Mg fluoride compound-based treating solutions as shown in Table 1 resulted in failure of coincidence of diffraction patterns of each treating solution with the diffraction patterns of the fluoride compound or oxyfluoride compound represented by $RE_nF_m$ (where RE represents a rare earth element or an alkaline earth metal element, n and m are each a positive integer) or of additive elements. Within the range of the content of the additive element shown in Table 1, the structure of the solution was not greatly changed. The diffraction pattern of the solution or of the film obtained by drying the solution was composed of a plurality of peaks including a diffraction peak whose half-value width is 1° or more. This indicates that the interatomic distance between the additive element and fluorine or between the metallic elements in the liquid or the coating film is different from that of $RE_nF_m$, and the crystalline structure is also different from that of $RE_nF_m$ (RE, m, and n are as defined above). The half-value width of the diffraction peak being 1° or larger indicated that the above-mentioned interatomic distance did not assume a constant value but had a certain distribution unlike the interatomic distance in ordinary metal crystals. The occurrence of such a distribution was due to arrangement of other atoms around the respective metal elements or fluorine atoms. The elements arranged around the metal atoms or fluorine atoms mainly included hydrogen, carbon, and oxygen. Application of external energy by heating or the like readily caused the hydrogen, carbon or oxygen atoms to migrate to change the structure and flowability of the treating solution. The X-ray diffraction pattern of the rare earth fluoride compound or alkaline earth metal fluoride compound in the form of sol or gel included peaks having a half-value width of more than 1 degree. The heat treatment caused a structural change in the rare earth fluoride compound or alkaline earth metal fluoride compound, and as a result a part of the above-mentioned diffraction patterns of $RE_nF_m$ or $RE_n(F,O)_m$ comes to appear. The additive elements shown in Table 1 would not have a long-period structure in the solution. The diffraction peak of $RE_nF_m$ had a half-value width narrower than the diffraction peaks of the above-mentioned sol or gel. It would be important that at least one peak having a half-value width of 1 degree or larger be observed in the diffraction pattern of the above-mentioned solution in order to increase the flowability of the solution and to make the thickness of the resultant coating film uniform. The peak of such a half-value width of 1 degree or larger and the peak of the diffraction pattern of $RE_nF_m$ or the peak of the oxyfluoride compound may be included. If there is observed only the diffraction pattern of $RE_nF_m$ or the oxyfluoride compound or if there is observed mainly the diffraction pattern having a half-value width of 1 degree or smaller in the diffraction pattern of the solution, the solution contains a solid phase as mixed with the sol or gel, so that the solution has decreased flowability and is difficult to be coated uniformly on the preformed body.

(1) A formed body or block (10×10×10 mm³) obtained by compaction molding the $Nd_2Fe_{14}B$ magnetic powder to a density of 80% in a magnetic field was soaked in a DyF-based coating composition for forming a coating film and the soaked block was placed under a reduced pressure of 2 to 5 torr to remove methanol as the solvent.

(2) The operation of Step (1) was repeated 1 to 5 times and the block was heated at a temperature of 400° C. to 1,100° C. for 0.5 to 5 hours.

(3) A pulsed magnetic field of 30 kOe or more was applied to the anisotropic magnet bearing the surface coating film formed in Step (2) in an anisotropic direction.

The resulting magnetized molded article was sandwiched between magnetic poles of a direct-current M-H loop measuring device so that the magnetization direction agrees with the application direction of magnetic field. FeCo alloy was used for the pole piece in the magnetic pole to which a magnetic field was to be applied and the value of the magnetization was calibrated with a sample of pure Ni or pure Fe having the same shape.

As a result, the coercive force of the block of the Nd—Fe—B sintered compact having formed thereon the rare earth fluoride coat film increased. That is, sintered magnets in which the Dy fluoride compound or the Dy oxyfluoride compound was segregated had coercive forces that were higher by 30% and 20%, respectively, than the sintered magnet in which no additive elements were contained. The additive elements as shown in Table 1 were added to respective fluoride compound solutions using corresponding organometal compounds in order to further increase the coercive force that increased by the impregnation and heat treatment of the additive elements-free solution. It turned out that the additive elements in the solutions shown in Table 1 further increased the coercive force of the sintered magnet as compared with the coercive force of the additive elements-free solution as a standard and that the additive elements contributed to an increase in coercive force. The results of rate of increase of coercive force are shown in Table 1. A short range structure was observed near the added elements as a result of the removal of the solvent and further heat treatment resulted in diffusion of the added elements together with the elements that constituted the solution along the surface of the magnetic particles of the molded article. These additive elements showed the tendency of being segregated in an area near the grain boundary together with some of the elements that constituted the solution. Therefore, the additive elements shown in Table 1 diffused as attended with at least one element of fluorine, oxygen, and carbon at the sintered magnet grain boundary, and remained in the area near the grain boundary. In the block of sintered magnet, there were observed concentration gradients of fluorine and at least one of the additive elements shown in Table 1 from the outer periphery side to the inside of the crystal grains in the sintered magnet. There was formed on the outermost surface of the block of sintered magnet an oxyfluoride compound that contained any one of the elements shown in Table 1, an oxyfluoride compound that contains any one of the element shown in Table 1 and carbon, or an oxyfluoride compound that contains at least one of the elements shown in Table 1 and at least one of the elements that constitute the sintered magnet. Such an outermost surface layer is necessary for improving the magnetic properties of the sintered magnet in addition to securing corrosion resistance of the sintered magnet. The contents of additive elements shown in Table 1 substantially correspond to their contents in the range where the solution is transmissive to light. With the contents of the additive elements in that range, improvement in the magnetic properties was observed. More particularly, it was possible to make a solution even if the concentration of the additive element was further increased. It was also possible to increase coercive force. Even when any one of the elements shown in Table 1 was added to either of the fluoride compound, the oxide compound, or the oxyfluoride compound that contained at least one slurry-like rare earth element, the sintered magnet had a coercive force higher than that of the case where no such additive elements were added. There was observed the tendency that the structure of the fluoride compound that constituted the solution changed to make the distribution of the additive elements in the solution nonuniform and prevent the diffusion of other elements.

The role of additive elements shown in Table 1 was any one of the following roles: 1) to segregate additive elements in the grain boundary vicinity and the surface energy is decreased; 2) to improve lattice match at the grain boundary; 3) to reduce defects at the grain boundary; 4) to promote grain boundary diffusion of the rare earth element etc.; 5) to improve magnetic anisotropic energy in the grain boundary vicinity; 6) to smooth interface with the fluoride compound or the oxyfluoride compound; 7) to increase anisotropic energy in the central part of the grain boundary; and 8) to decrease unevenness in the interface that contacts the matrix. As a result, there was obtained by impregnation coating and diffusion by heat treatment, either one of the following advantageous effects. That is, there was observed either one of an increase in coercive force, improvement of squareness of demagnetization curve, an increase in residual magnetic flux density, an increase in energy product, an increase in Curie temperature, a decrease in magnetization magnetic field, a decrease in dependence of coercive force and residual magnetic flux density on temperature, an improvement of corrosion resistance, an increase in specific resistance, or a decrease in heat demagnetization rate. The concentration distribution of the additive elements shown in Table 1 showed the tendency that the concentration of the additive element decreases from the outer periphery to the inside of a crystal grain on the average, becoming a high concentration in the grain boundary part. The width of the grain boundary tends to differ between the grain boundary triple area and a site remote from the grain boundary triple area, with the grain boundary triple areas vicinity having a larger width than the site remote from the grain boundary triple area. The additive elements shown in Table 1 were prone to be segregated either in the grain boundary phase or at the edge of the grain boundary, or outer peripheral part (grain boundary side) in the grain as seen from the grain boundary toward inside of the grain. The additives in the solution of which the effect of improving the magnetic properties of the above-mentioned magnet was confirmed includes an element selected from among elements having an atomic number of 18 to 86 including Mg, Al, Si, Ca, Ti, V, Cr, Mn, Fe, Co, Ni, Cu, Zn, Ga, Ge, Sr, Zr, Nb, Mo, Pd, Ag, In, Sn, Hf, Ta, W, Ir Pt, Au, Pb, and Bi shown in Table 1 and all the transition metal elements. At least one of these elements and fluorine showed concentration gradients in the crystal grains of the sintered magnet. The additive elements were used in the form of solutions in the impregnation treatment and then they were heated for diffusion. For this reason, unlike the compositional distribution of the elements added to the sintered magnet in advance, the above-mentioned additive elements occurred in high concentrations in the area near the grain boundary where fluorine was segregated whereas segregation of the elements added to the sintered magnet in advance was observed in the area near the grain boundary where segregation of a small amount of fluorine was observed (within a distance of 1,000 nm on average from the center of the grain boundary). When the additive elements are present in low concentrations in the solution, their presence can be confirmed as a concentration gradient or a concentration difference near the grain boundary triple areas. Thus, when the solution to which the additive element had been added was applied to a magnet block by impregnation and the impregnated magnet block was heated to improve the magnetic properties of the resultant sintered magnet, the magnet had the following features. 1) The concentration gradient or the average concentration difference of elements having an atomic number of 18 to 86 including the element shown in Table 1 or the transition metal elements is observed along a direction of from the outermost surface of to the inside of the crystal grains of the sintered magnet. 2) In a lot of parts, the segregation near the grain boundary of one or more of the elements having atomic number of 18 to 86 including the elements shown in Table 1 or the transition metal elements occurs as accompanied by fluorine. 3) The concentration of fluorine is higher in the grain boundary phase and lower on the outside of the grain boundary phase. Near the grain boundary where there is observed a concentration difference of fluorine, there occurs segregation of one or more of the elements that constitute the impregnation liquid having an atomic number of 18 to 86 including the elements shown in Table 1 or the transition metal elements. 4) At least one of the elements that constitute the solution including elements having an atomic number of 18 to 86 including the additive elements shown in Table 1 or the transition metal elements has a concentration gradient from the surface toward inside of crystal grains. The fluorine concentration is maximal near the grain boundary between the magnet and the fluorine-containing film that has grown on the magnet from the solution or a part outside the grain boundary as seen from the magnet. The fluoride compound near the grain boundary contains oxygen or carbon, which contributes to either of high corrosion resistance or high electrical resistance, or high magnetic properties. In this fluorine containing film, there is detected at least one element from among the elements having an atomic number of 18 to 86 elements including the additive elements shown in Table 1 or the transition metal elements. The above-mentioned additive elements are contained in higher concentrations near the impregnation paths of fluorine in the magnet than in other portions, and there is observed any one of the effects including an increase in coercive force, an improvement of squareness of demagnetization curve, an increase in residual magnetic flux density, an increase in energy product, an increase in Curie temperature, a decrease in magnetization field, a decrease in dependence of coercive force and residual magnetic flux density on temperature, an improvement of corrosion resistance, an increase in specific resistivity, a decrease in heat demagnetization rate, and an increase in magnetic specific heat. The concentration difference of the above-mentioned additive element or elements can be confirmed by analyzing the crystal grain of the sintering block by EDX (energy dispersive x-ray) profile of a transmission electron microscope, EPMA (electron probe micro-analysis) and ICP (inductively coupled plasma) analysis, or the like. It can be analyzed EDX of the transmission electron microscope and EELS (electron energy-loss spectroscopy) that the element or elements having an atomic number of 18 to 86 added to the solution segregate near the fluorine atom (for example, within 2,000 nm, preferably within 1,000 nm from the position where the segregation of the fluorine atoms occurs).

Such a compositional analysis indicated that in the case of a preformed body that had been impregnated with the DyF solution under vacuum of 200 Pa, a continuous layer of the fluoride compound was formed in the direction of the impregnation and the continuous layer of the fluoride compound contains granular oxyfluoride compound at the triple area of the grain boundary. The layer of the fluoride compound or the oxyfluoride compound formed by such a vacuum impregnation treatment was continuous from one side to the opposite side of the sintered magnet in the direction of impregnation. In the continuous layer of the fluoride compound or the oxyfluoride compound, Nd was in larger amounts than Dy and F, C, and O were detected, with Dy being diffused from the grain boundary toward the inside of the grain. The continuous layer of the fluoride compound or the oxyfluoride compound was in larger amounts in a direction parallel to the direction of impregnation than in a direction perpendicular to the direction of impregnation.

SIXTH EMBODIMENT

The rare earth permanent magnet according to this example is a sintered magnet that was obtained by diffusing fluorine and a G component (hereafter, "G") consisting of one or more elements selected from the transition metal elements and one or more rare earth elements, or of one or more transition metal elements and one or more alkaline earth metal elements into an R—Fe—B (R represents a rare earth element) sintered magnet through the surface thereof. It has a chemical composition represented by the following formula (1) or (2).

$$R_a G_b T_c A_d F_e O_f M_g \qquad (1)$$

$$(R \cdot G)_a +_b T_c A_d F_e O_f M_g \qquad (2)$$

In the above formulae (1) and (2), R represents one or more elements selected from rare earth elements. M represents an element belonging to Group 2 to Group 16 excepting the rare earth element, C, and B, the element existing in the sintered magnet before the fluorine-containing solution is applied thereto. While G represents elements consisting of one or more elements selected from the transition metal elements and one or more rare earth elements, or of one or more transition metal elements and one or more alkaline earth metal elements as mentioned above, "R" and "G" may have the same elements. The composition of the sintered magnet is represented by the formula (1) and by the formula (2) when R and G do not contain the same elements. "T" represents one or two elements selected from Fe and Co. "A" represents one or two elements selected from B (boron) and C (carbon). "a" to "g" (a-g) each represent atomic percents of the alloy, and "a" and "b" satisfy: $10 \leq a \leq 15$, and $0.005 \leq b \leq 2$ for the formula (1), or $10.005 \leq a \leq 17$ for the formula (2); $3 \leq d \leq 15$; $0.01 \leq e \leq 4$; $0.04 \leq f \leq 4$; $0.01 \leq g \leq 11$; and the balance being "c". This rare earth permanent magnet has the following features. That is, at least one element selected from F and the transition metal elements that constitute the rare earth permanent magnet is distributed such that the concentration thereof increases on average from the center of the magnet toward the surface of the magnet. In the grain boundary part that surrounds main phase crystal grains consisting of tetragonal $(R,G)_2 T_{14} A$ in the sintered magnet, the concentration of G/(R+G) included in the grain boundary is higher on average than the concentration of G/(R+G) in the main phase crystal grain. The oxyfluorides, the fluorides, or the oxyfluoride carbide of R and G exist in a depth region of at least 10 μm from the surface of the magnet in the grain boundary part. The coercive force near the surface layer of the magnet is higher than the inside of the magnet. A concentration gradient of the transition metal element is observed in the direction of from the surface of the sintered magnet toward the center of the sintered magnet. The rare earth permanent magnet can be produced, for example, by the following method.

A treating solution for forming a rare earth fluoride coating film to which the element "M", one of the transition metal elements listed in Table 1, was added having the composition of $(Dy_{0.9} M_{0.1}) F_x$ (x=1 to 3) was prepared as follows.

(1) In the case of a salt having high solubility in water, for example, Dy, 4 g Dy acetate was introduced in 100 ml water, and the resultant mixture was completely dissolved by using a shaker or an ultrasonic mixer.

(2) Hydrofluoric acid diluted to 10% was gradually added to the obtained solution by an equivalent for a chemical reaction by which $DyF_x$ (where x=1 to 3) is created.

(3) The solution in which gelled $DyF_x$ (where x=1 to 3) was precipitated was stirred by an ultrasonic stirrer for 1 hour or more.

(4) After centrifuging at 4,000 to 6,000 rpm, the supernatant was removed, and approximately the same volume of methanol was added.

(5) The methanol solution including gelled DyF clusters was stirred to form a complete suspension. The suspension was stirred by an ultrasonic stirrer for one hour or more.

(6) The procedures (4) and (5) were repeated three to ten times until no anions such as acetate ions and nitrate ions were detected.

(7) Finally, in the case of DyF-based fluoride compound, almost transparent sol-like $DyF_x$ (x=1 to 3) was obtained. A 1 g/5 ml methanol solution of $DyF_x$ was used as the treating solution.

(8) Each of the organometal compounds shown in Table 1 excepting carbon (C) was added to an aliquot of the above-mentioned solution.

It was also possible to prepare the other coating solutions for forming rare earth fluoride or alkaline earth metal fluoride coating film by substantially the same process as that mentioned above. Addition of various elements to Dy, Nd, La or, Mg fluoride compound-based treating solutions as listed in Table 1 results in a failure of coincidence of diffraction patterns of each treating solution with the diffraction patterns of the fluoride compound or oxyfluoride compound represented by $RE_nF_m$ (where RE represents a rare earth element or an alkaline earth metal element; n, m, p and r are each a positive integer) or of additive elements. The structure of the solution was not greatly changed by the additive element when the content thereof was within the range shown in Table 1. The diffraction pattern of the solution or of a film obtained by drying the solution included a plurality of peaks each having a diffraction peak whose half-value width was 1 degree or larger. This indicated that the treating solution was different from $RE_nF_m$ in respect of an interatomic distance between the additive element and fluorine or between the metallic elements, and also in respect of the crystalline structure. The half-value width of the diffraction peak being 1 degree or larger indicated that the above-mentioned interatomic distance did not assume a constant value but had a certain distribution unlike an ordinary metal crystal having a constant interatomic distance. Such a distribution was formed due to presence of other atoms mainly including hydrogen, carbon, and oxygen, arranged differently from those in the above-mentioned compounds, around the atom of metal element or fluorine. The application of external energy such as heat caused the atoms of hydrogen, carbon, oxygen, etc. to easily migrate, resulting in a change in structure and fluidity of the treating solution. The X-ray diffraction patterns of the sol and the gel that included peaks having half-value widths larger than 1 degree underwent a structural change by heat treatment and some of the above-mentioned diffraction patterns of $RE_nF_m$ or $RE_n(F,O)_m$ came to appear. The additive elements listed in Table 1 did not have a long-period structure in the solutions. The diffraction peak of the $RE_nF_m$ had a half-value width narrower than that of the diffraction peak of the sol or gel. It was important for the diffraction pattern of the above-mentioned solution to include at least one peak having a half-value width of 1 degree or larger in order to increase the flowability of the solution and to make the thickness of the resultant coating film uniform. The peak of such a half-value width of 1 degree or larger and the peak of the diffraction pattern of the $RE_nF_m$ or the peak of the oxyfluoride compound may be included in the diffractive pattern of the solution. When only the diffraction pattern of the $RE_nF_m$ or the oxyfluoride compound was observed, or when mainly the diffraction pattern having a half-value width of 1 degree or smaller was observed in the diffraction pattern of the solution, the solution contained mixed therein a solid phase, not in a sol or gel state, so that the solution had poor flowability. However, an increase in coercive force was observed. The fluoride compound solution was coated on the preformed body by the following steps.

(1) A molding in a magnetic field of Nd—Fe—B ($10\times10\times10$ $mm^3$) was compaction molded at room temperature and immersed in a coating solution for forming a DyF-based coating film. The soaked block was placed under a reduced pressure of 2 to 5 torr to remove methanol as the solvent.

(2) The operation of Step (1) was repeated 1 to 5 times and the block was heated at a temperature of 400° C. to 1,100° C. for 0.5 to 5 hours.

(3) A pulsed magnetic field of 30 kOe or stronger was applied to the anisotropic magnet provided with a surface coating film formed in Step (2) in the direction of anisotropy.

A magnetization curve of the magnetized compact was prepared based on results of measurements performed by placing the compact between the magnetic poles of a direct-current (DC) M-H loop measuring device so that the magnetization direction of the compact agreed with the direction of the applied magnetic field. FeCo alloy was used for the magnetic pole pieces for use in applying a magnetic field to the magnetized compact were made of a FeCo alloy. The values of the magnetization were corrected using a pure Ni sample or a pure Fe sample having the same shape. Analysis of the compact by wavelength dispersive X-ray spectroscopy indicated that an average concentration of fluorine or carbon measured over an area not smaller than 100 $\mu m^2$ is such that a ratio of a value measured in an area within 100 μm from an outermost surface of the ferromagnetic material to a value measured in an area including a central part at a distance of not smaller than 100 μm from the outermost surface is 1±0.5.

As a result, the block of Nd—Fe—B sintered body having formed thereon the rare earth fluoride coating film by the impregnation process had a coercive force that has increased by 50% as compared with the case without impregnation treatments. By using the treating solution to which the transition metal element was added, the sintered body acquired a higher coercive force than that of a sintered magnet having no additive element. Such a further increase of the coercive force which had already been increased by the coating of the solution with no additive element and by the subsequent thermal treatment indicated that these additive elements contributed to the increase of coercive force. A short range structure was observed near the added elements as a result of the removal of the solvent and a further heat treatment resulted in diffusion of the added elements together with the elements that constituted the solution along the grain boundaries of the sintered magnet. These additive elements showed a tendency of being segregated near grain boundary vicinity together with some of the elements that constituted the solution. The chemical composition of the sintered magnet that showed a high coercivity was such that the concentration of the element that constituted the fluoride solution showed a tendency of being high on the outer periphery portion of the magnet and low in the central part of the magnet. This is because when the fluoride compound solution containing additive element(s) was coated on the outer surface of the sintered magnet block and dried, a fluoride compound or oxyfluoride compound containing the additive element and having a short range structure grows and at the same time diffusion proceeds along the grain boundary vicinity. That is, there are observed concentration gradients of fluorine and at least one element listed in Table 1 from the side of the grain boundary to the inside of the crystal grains in the sintered magnet block. The contents in solution of the additive elements listed in Table 1 substantially correspond to the ranges where the solution has optical transparency and it is possible to prepare a solution even if the concentration of the additive element is further increased. When an element having an atomic number of 18 to 86 is added to any one of the fluoride, oxide, and oxyfluoride containing at least one rare earth element in the form of slurry, improvements in magnetic properties such as a coercive force higher than that of the case where no such element is added could be observed. The additive elements have any of the following roles: 1) to reduce an interface energy by being segregated near a grain boundary; 2) to increase the lattice matching of a grain boundary; 3) to reduce defects at a grain boundary; 4) to promote grain boundary diffusion of the rare earth element and the like; 5) to increase a magnetic anisotropic energy near a grain boundary; 6) The interface with the fluoride compound, the oxyfluoride compound, or the carbide oxyfluoride compound is smoothed; 7) to increase anisotropy of a rare earth element; and 8) to remove oxygen from the matrix; and 9) to raise the Curie temperature of the matrix. As a result, there was obtained either one of the following advantageous effects. That is, there was observed either one of an increase in coercive force, improvement of squareness of demagnetization curve, an increase in residual magnetic flux density, an increase in energy product, an increase in Curie temperature, a decrease in magnetization magnetic field, a decrease in dependence of coercive force and residual magnetic flux density on temperature, an improvement of corrosion resistance, an increase in specific resistance, or a decrease in heat demagnetization rate. The concentration distribution of the additive elements shown in Table 1 showed the tendency that the concentration of the additive element decreases from the outer periphery to the inside of a crystal grain on the average, becoming a high concentration in the grain boundary part. The width of the grain boundary tends to differ between the grain boundary triple area and a site remote from the grain boundary triple area, with the grain boundary triple areas vicinity having a larger width than the site remote from the grain boundary triple area. The additive elements shown in Table 1 were prone to be segregated either in the grain boundary phase or at the edge of the grain boundary, or outer peripheral part (grain boundary side) in the grain as seen from the grain boundary toward inside of the grain.

These additive elements are applied by using their solution and heated to diffuse, so that they tend to be in high concentrations near the grain boundaries where fluorine or the main component of the fluoride compound solution is segregated unlike the composition distribution of the elements that have been added to the sintered magnet in advance. In the grain boundaries where fluorine is segregated in low concentrations, segregation of the elements that have been added in advance is observed and provides an average concentration gradient from the outermost surface to the inside of the magnet block. When the concentration of the additive element is low in the solution, the concentration gradient or difference in concentration can be confirmed. Thus, when the solution to which the additive element had been added was applied to a magnet block by impregnation and the impregnated magnet block was heated to improve the magnetic properties of the resultant sintered magnet, the magnet has the following features. 1) The concentration gradient or the average concentration difference of transition metal elements is observed along a direction of from the outermost surface of to the inside of the crystal grains of the sintered magnet. 2) Segregation of transition metal elements occurs as accompanied by fluorine. 3) The concentration of fluorine is higher in the grain boundary phase and lower on the outside of the grain boundary phase. Near the grain boundary where there is observed a concentration difference of fluorine, there may occur segregation of transition metal elements. Average concentration gradients or concentration differences are observed from the surface to the inside of the magnet block. 4) On the outermost surface of the sintered magnet grows a fluoride compound layer or an oxyfluoride compound layer that includes a transition metal element, fluorine, and carbon.

SEVENTH EMBODIMENT

The rare earth permanent magnet according to this example is a sintered magnet that was obtained by diffusing fluorine and a G component (hereafter, "G") consisting of one or more elements selected from the transition metal elements and one or more rare earth elements, or of one or more transition metal elements and one or more alkaline earth metal elements into an R—Fe—B (R represents a rare earth element) sintered magnet through the surface thereof. It has a chemical composition represented by the following formula (1) or (2).

$$R_a G_b T_c A_d F_e O_f M_g \quad (1)$$

$$(R \cdot G)_{a+b} T_c A_d F_e O_f M_g \quad (2)$$

In the above formulae (1) and (2), R represents one or more elements selected from rare earth elements. M represents an element belonging to Group 2 to Group 16 excepting the rare earth element, C, and B, the element existing in the sintered magnet before the fluorine-containing solution is applied thereto. While G represents elements consisting of one or more elements selected from the transition metal elements and one or more rare earth elements, or of one or more transition metal elements and one or more alkaline earth metal elements as mentioned above, "R" and "G" may have the same elements. The composition of the sintered magnet is represented by the formula (1) and by the formula (2) when R and G do not contain the same elements. "T" represents one or two elements selected from Fe and Co. "A" represents one or two elements selected from B (boron) and C (carbon). "a" to "g" (a-g) each represent atomic percents of the alloy, and "a" and "b" satisfy: $10 \leq a \leq 15$, and $0.005 \leq b \leq 2$ for the formula (1), or $10.005 \leq a \leq 17$ for the formula (2); $3 \leq d \leq 15$; $0.01 \leq e \leq 4$; $0.04 \leq f \leq 4$; $0.01 \leq g \leq 11$; and the balance being "c". This rare earth permanent magnet has the following features. That is, at least one element selected from F, semimetal elements, and the transition metal elements that constitute the rare earth permanent magnet is distributed such that the concentration thereof increases on average from the center of the grains toward the surface of the grains. In the crystal grain boundary vicinity (at a distance within 100 nm from the center of the grain) that surrounds main phase crystal grains consisting of tetragonal $(R,G)_2 T_{14} A$ in the sintered magnet, the concentration of G/(R+G) included in the grain boundary is higher on average than the concentration of G/(R+G) in the main phase crystal grain. The oxyfluorides, the fluorides, or the oxyfluoride carbide of R and G exist in a depth region of at least 1 μm from the surface of the magnet in the grain boundary part. The coercive force near the surface layer of the magnet is higher than the inside of the magnet. A concentration gradient of the transition metal element is observed in the direction of from the surface of the sintered magnet toward the center of the sintered magnet. The rare earth permanent magnet with the above-mentioned features can be produced, for example, by the following method.

A treating solution for forming a rare earth fluoride or alkaline earth metal fluoride coating film to which a transition metal element was added was prepared according to the following steps.

(1) In the case of a salt having high solubility in water, for example, Dy, 4 g Dy acetate was introduced in 100 ml water, and the resultant mixture was completely dissolved by using a shaker or an ultrasonic mixer.

(2) Hydrofluoric acid diluted to 10% was gradually added to the obtained solution by an equivalent for a chemical reaction by which $DyF_x$ (where x=1 to 3) is created.

(3) The solution in which gelled $DyF_x$ (where x=1 to 3) was precipitated was stirred by an ultrasonic stirrer for 1 hour or more.

(4) After centrifugation at 4,000 to 6,000 rpm, the supernatant was removed, and approximately the same volume of methanol was added.

(5) The methanol solution including gelled DyF clusters was stirred to form a complete suspension. The suspension was stirred by an ultrasonic stirrer for one hour or more.

(6) The procedures (4) and (5) were repeated three to ten times until no anions such as acetate ions and nitrate ions could be detected.

(7) In the case of DyF-based fluoride compound, almost transparent sol-like $DyF_x$ (x=1 to 3) was obtained. A 1 g/5 ml methanol solution of DyF was used as the treating solution.

(8) Each of the organometal compounds shown in Table 1 excepting carbon (C) was added to an aliquot of the above-mentioned solution.

It was also possible to prepare the other coating solutions for forming rare earth fluoride, alkaline earth metal fluoride-based coating films by substantially the same process as that mentioned above. Even when various elements were added to fluorine-based treating solutions containing a rare earth element or an alkaline earth element, such as Dy, Nd, La, or Mg, the resultant solutions did not exhibit a diffraction pattern corresponding to that of a fluoride compound or an oxyfluoride compound expressed as $RE_nF_m$ (RE represents a rare earth element or an alkaline earth element; n and m represent positive numbers) or $RE_nF_mO_pC_r$ (RE represents a rare earth element or an alkaline earth element; O, C, and F represent oxygen, carbon, and fluorine, respectively; n, m, p, and r are positive numbers), or a compound with an additive element. It was observed that the diffraction pattern of the solutions or a film formed by drying the solutions included multiple peaks as the main peaks each having a half-value width of 1 degree or larger. This indicated that the treating solution was different from that of the $RE_nF_m$ in terms of an interatomic distance between the additive element and fluorine, or between the metal elements, and also in terms of crystalline structure. The half-value width of the diffraction peak being 1 degree or larger indicated that the above-mentioned interatomic distance did not assume a constant value but had a certain distribution unlike the interatomic distance in ordinary metal crystals. The occurrence of such a distribution was due to the arrangement of other atoms around the respective metal elements or fluorine atoms. The elements arranged around the metal atoms or fluorine atoms mainly include hydrogen, carbon, and oxygen. Application of external energy such as heating readily causes the hydrogen, carbon or oxygen atoms to migrate to change the structure and flowability of the treating solution. The X-ray diffraction pattern of the sol and the gel, whose peaks had a half-value width larger than 1 degree, exhibited a structural change by a thermal treatment, and some of the diffraction patterns of the $RE_nF_m$, $RE_n(F, C, O)_m$ (the ratio of F, C, and O is arbitrary), or $RE_n(F, O)_m$ (the ratio of F and O is arbitrary) occurred. The diffraction peaks of the $RE_nF_m$ or the like had narrower half-value widths than that of the above-described sol or gel. It was important that at least one peak having a half-value width of 1 degree or larger was observed in the diffraction pattern of the above-mentioned solution in order to increase the flowability of the solution and to make the thickness of the resultant coating film uniform.

(1) A compact ($10 \times 10 \times 10$ mm$^3$) of Nd—Fe—B particles obtained by compaction molding the Nd—Fe—B powder in a magnetic field was soaked in a treating solution for forming a Dy—F based coating film and the soaked compact was placed under a reduced pressure of 2 to 5 ton to remove the solvent methanol.

(2) The operation of Step (1) was repeated 1 to 5 times and the soaked compact was heated at a temperature of 800° C. to 1,100° C. for 0.5 to 5 hours.

(3) A pulsed magnetic field of 30 kOe or stronger was applied to the sintered magnet or the Nd—Fe—B-based magnetic powder provided with a surface coating film in the step (2) in the anisotropy direction.

A demagnetization curve of the magnetized sample was determined by placing the sample between the magnetic poles of a DC M-H loop measurement device such that the magnetization direction of the compact agreed with the direction of the applied magnetic field, and then applying the magnetic field between the magnetic poles. The magnetic pole pieces for the application of the magnetic field to the magnetized sample were made of a FeCo alloy. The values of magnetization were corrected using a pure Ni sample and a pure Fe sample, each having the same shape.

As a result, the block of Nd—Fe—B sintered body having the rare earth fluoride coating film formed thereon acquired an increased coercive force. By using the treating solution to which the transition metal element was added, the sintered body acquired a higher coercive force or squareness of the demagnetization curve than that of a sintered magnet containing no additive elements. An average value of concentrations of fluorine or carbon measured over an area of 200 µm$^2$ or more is 1±0.8 in terms of a ratio of the value measured at a depth of within 200 µm from the outermost surface of the block to the value measured at a central part at a distance of 200 µm or more from the outermost surface. Such a further increase of the coercive force or the squareness which was already increased by the coating of the solution with no additive elements and by the subsequent thermal treatment indicated that these additive elements contributed to the increase of coercive force. Near the element added to the solution, a short-range structure was observed due to the removal of the solvent. Further heating caused the element to diffuse together with the constituent element of the solution along the grain boundary of the sintered magnet. These additive elements showed the tendency of segregating near a grain boundary together with some of the elements that constituted the solution. The sintered magnet exhibiting a high coercive force has a composition such that concentrations of elements that constitute the fluoride compound solution tend to be higher at outer periphery portion of the magnet and lower at the central portion of the magnet. This is because the fluoride compound solution containing an additive element is coated and dried on the outer surface of the sintered magnet block in order to allow the fluoride or oxyfluoride containing the additive element having a short-range structure to grow and diffuse along the grain boundary vicinity. That is, there is observed a concentration gradient or difference in concentration of fluorine and at least one additive element selected from transition metal elements and semimetal elements listed in Table 1. Even when the transition metal element is added to any one of the fluoride, oxide, or oxyfluoride each containing at least one rare earth element in the form of slurry, improvements in magnetic properties, for example, higher coercive force as compared with the case where no transition metal elements are added can be confirmed. However, the effect of improving the magnetic properties, such as the effect of improving coercive force, is remarkable when at least one of the transition metal elements and semimetal elements is added to the transparent solution. In the case where neither rare earth metal elements nor alkaline earth metal elements are used, improvements in magnetic properties can be observed by preparing a fluoride compound solution containing one of the additive elements listed in Table 1 and coating it on a magnetic body. The additive elements have any of the following roles: 1) to reduce an interface energy by being segregated near a grain boundary; 2) to increase the lattice matching of a grain boundary; 3) to reduce defects at a grain boundary; 4) to promote grain boundary diffusion of the rare earth element and the like; 5) to increase a magnetic anisotropic energy near a grain boundary; 6) to smooth the interface with the fluoride compound, the oxyfluoride compound, or the carbide oxyfluoride compound; 7) to increase anisotropy of a rare earth element; 8) to remove oxygen from the matrix; 9) to raise the Curie temperature of the matrix; and 10) to change the electronic structure of the grain boundary by being combined with other elements that segregate in the grain boundary. As a result, there was obtained any one of the following advantageous effects: an increase in coercive force, an improvement in squareness of a demagnetization curve, an increase in residual magnetic flux density, an increase in energy product, an increase in Curie temperature, a decrease in magnetization magnetic field, a decrease in dependence of coercive force and residual magnetic flux density on temperature, an improvement in corrosion resistance, an increase in specific resistance, or a decrease in heat demagnetization rate. The transition metal elements or semimetal elements that are added to the solution and diffused therein prone to be segregated either in the grain boundary phase or at the edge of the grain boundary, or outer peripheral part (grain boundary side) in the grain as seen from the grain boundary toward inside of the grain. These additive elements are applied by using their solution and heated to diffuse, so that they tend to be in high concentrations near the grain boundaries where fluorine or the main component of the fluoride compound solution is segregated unlike the composition distribution of the elements that have been added to the sintered magnet in advance. In the grain boundaries where fluorine is segregated in low concentrations, segregation of the elements that have been added in advance is observed and provides an average concentration gradient from the outermost surface to the inside of the magnet block. It is possible to improve the magnetic properties if the additive elements are segregated at places independent of the places where fluorine is segregated. When the concentration of the additive element is low in the solution, the concentration gradient or difference in concentration can be confirmed by analyzing and comparing samples obtained by cutting the magnet block. Thus, when the solution to which the additive element had been added was applied to a magnet block by impregnation and the impregnated magnet block was heated to improve the magnetic properties of the resultant sintered magnet, the magnet has the following features. 1) The concentration gradient or the average concentration difference of elements having an atomic number of 18 to 86 such as transition metal elements or semimetal elements in a solution consisting mainly of a fluoride compound is observed along a direction of from the outermost surface of to the inside of the crystal grains of the sintered magnet, with a tendency that the concentration decreases from the surface of the magnet to the inside. 2) Segregation of one or more of the elements having atomic number of 18 to 86 including transition metal elements or semimetal elements that are added to the solution occurs as accompanied by fluorine. In some cases, the concentration distribution of fluorine is close to the concentration profile of the additive element. In other cases, the additive elements are segregated without being accompanied by fluorine. Some additive elements are not segregated but introduced into the matrix. 3) The concentration of fluorine is higher in the grain boundary phase and lower on the outside of the grain boundary phase. Near the grain boundary where there is observed a concentration difference of fluorine, there may occur segregation of one or more of the additive elements such as transition metal elements. Average concentration gradients or concentration differences are observed from the surface to the inside of the magnet block. 4) On the outermost surface of the sintered magnet grows a layer that includes an oxyfluoride compound or a fluoride compound containing a transition metal element, fluorine, and carbon, or an oxyfluoride compound or a fluoride compound containing an element having an atomic number of 18 to 86 to a thickness of 1 to 10,000 nm. The elements having an atomic number of 18 to 86 manifest differences in concentration of 10 ppm or more in the direction of depth that ranges from the outermost surface toward the inside of the crystal grains. The fluorine-containing layer contains a portion of constituent elements of the sintered magnet. The surface layer can be removed, for example, by polishing before final product is obtained. However, the surface layer may be left as is as a protective layer for anticorrosion. 5) The concentration gradient of additive element that has been added in advance before the solution treatment and the concentration gradient of the element added by the solution treatment are different from each other. The former does not depend on the average concentration gradient of the main component of the fluoride compound solution, such as fluorine while the concentration profile of the latter depends on the concentration profile of at least one element that constitutes the fluoride compound solution.

EIGHTH EMBODIMENT

Quenched powder consisting mainly of $Nd_2Fe_{14}B$ is formed as an Nd—Fe—B-based powder, and a fluorine compound is formed at the surface thereof. When $DyF_3$ is formed at the surface of the quenched powder, $Dy(CH_3COO)_3$ is dissolved in $H_2O$ as a raw material and HF is added to it. By adding HF, a gelatinous $DyF_3 \cdot XH_2O$ is formed. It is centrifuged to remove the solvent. When the concentration of the sol-state rare earth fluorine compound is 10 $g/dm^3$ or more, the permeability of an optical path length of 1 cm in the processing liquid is 5% or more at a wavelength of 700 nm. A compound or solution including at least one element selected from transition metal elements and semimetal elements is added to such a solution with optical transparency. After adding it, the solution has a broad X-ray diffraction peak, with a full width at half maximum of the diffraction peak being from 1 to 10 degrees, and has flowability. This solution is mixed with the aforementioned Nd—Fe—B powder. The solvent of the mixture is evaporated, and the hydrated water is evaporated by heating. In a heat-treatment at 500 to 800° C., it is understood that the crystal structures of the fluorine compound film include an $NdF_3$ structure, an $NdF_2$ structure, oxyfluoride, and so on, each containing the added element. Segregation of the added element is observed in addition to segregation of Dy and Nd along the diffusion path in the magnetic particles and segregation of the plate-like Nd, Dy, and fluorine. An average concentration of fluorine or carbon measured over an area not smaller than 100 µm$^2$ is such that a ratio of a value measured in an area within 100 µm from an outermost surface of the ferromagnetic material to a value measured in an area including a central part at a distance of not smaller than 100 µm from the outermost surface is 1±0.5. The magnetic properties are improved due to an increase in the anisotropic energy, an improvement in lattice matching at the grain boundaries, a reduction in the parent phase by fluorine, and an improvement in the ferromagnetic coupling by diffusion of iron into the fluoride. In order to decrease the amount of the heavy rare earth element used, at least one element selected from semimetal elements and transition metal elements segregates by surface treatment using the fluoride solution in which the semimetal elements and transition metal elements and by subsequent diffusion, thereby any effect of an increase in the coercive force, an increase in the square-loop characteristics of the demagnetization curve, an increase in the residual flux density, an increase in the energy product, an increase in the Curie point, a decrease in the magnetization field, a decrease in the temperature dependence of the coercive force and the residual flux density, an improvement in the corrosion resistance, an increase in the specific resistance, and a decrease in the thermal demagnetization is observed in the Nd—Fe—B-based magnetic particles, resulting in that it is made possible to improve the aforementioned magnetic properties of the magnetic particles used for bonded magnets, hot forming anisotropic magnetic particles, and hot forming anisotropic sintered magnets.

NINTH EMBODIMENT

The rare earth permanent magnet according to this embodiment is a sintered magnet that is obtained by diffusing a G component (hereafter, "G") {where G represents an element selected from one or more metal elements (i.e., at least one element selected from metal elements of Groups 3 to 11 exclusive of rare earth elements, or elements of Group 2 and Groups 12 to 16 exclusive of C and B) and one or more rare earth elements} and fluorine, into an R—Fe—B (R represents a rare earth element) sintered magnet through the surface thereof. It has a chemical composition represented by the following formula (1) or (2).

In the above formulae (1) and (2), R represents one or more elements selected from rare earth elements. M represents an element belonging to Groups 2 to 16 exclusive of C, B, and the element existing in the sintered magnet before the fluorine-containing solution is applied thereto. G represents elements consisting of one or more metal elements (i.e., metal elements belonging to Groups 3 to 11 exclusive of rare earth elements, or elements belonging to Group 2 and 12 to 16 exclusive of C and B) and one or more elements selected from the rare earth elements, or consisting of metal elements (i.e., metal elements belonging to Groups 3 to 11 exclusive of rare earth elements, or elements belonging to Group 2 and 12 to 16 exclusive of C and B) and one or more alkaline earth metal elements as mentioned above. "R" and "G" may have the same elements. The composition of the sintered magnet is represented by the formula (1) when R and G do not include the same elements and by the formula (2) when R and G include the same elements. "T" represents one or two elements selected from Fe and Co. "A" represents one or two elements selected from B (boron) and C (carbon). "a" to "g" (a-g) each represent atomic percents (%) of the alloy, and "a" and "b" satisfy: 10≦a≦15, and 0.005≦b≦2 for the formula (1), or 10.005≦a≦17 for the formula (2); 3≦d≦15; 0.01≦e≦4; 0.04≦f≦4; 0.01≦g≦11; and the balance being "c". This rare earth permanent magnet has the following features. That is, at least one element selected from F and the metal elements (i.e. elements belonging to Groups 2 to 16 exclusive of C and B) that constitute the rare earth permanent magnet is distributed such that the concentration thereof increases on average from the center of the magnet toward the surface of the magnet. And in the grain boundary parts that surround main phase crystal grains consisting of tetragonal $(R,G)_2T_{14}A$ in the sintered magnet, the concentration of G/(R+G) included in the grain boundaries is higher on average than the concentration of G/(R+G) in the main phase crystal grains. The oxyfluorides, the fluorides, or the oxyfluoride carbide of R and G exist in a depth region of at least 10 µm from the surface of the magnet in the grain boundary parts. The coercive force near the surface layer of the magnet is higher than the inside of the magnet. One of the features of the rare earth permanent magnet is that there is observed a concentration gradient or difference in concentration of the metal elements (i.e., elements belonging to Groups 2 to 16 exclusive of rare earth elements and exclusive of rare earth elements) in the direction of from the surface of the sintered magnet toward the center of the sintered magnet. Such a rare earth permanent magnet can be produced, for example, by the following method.

A treating solution for forming a rare earth fluoride or alkaline earth metal fluoride coating film to which one or more metal elements (i.e., at least one element selected from metal elements belonging to Groups 3 to 11 exclusive of rare earth elements, or elements belonging to Groups 2 and 12 to 16 exclusive of C and B) were added was prepared according to the following steps.

(1) 1-10 g of a salt having high solubility in water, for example, Dy acetate or Dy nitrate in the case of Dy, was introduced in 100 ml water, and the resultant mixture was completely dissolved by using a shaker or an ultrasonic mixer.

(2) Hydrofluoric acid diluted to 10% was gradually added to the obtained solution by an amount corresponding to an equivalent for a chemical reaction by which $DyF_x$ (where x=1 to 3) is created.

(3) The solution in which gelled $DyF_x$ (where x=1 to 3) was precipitated was stirred by an ultrasonic stirrer for 1 hour or more.

(4) After centrifugation at 4,000 to 10,000 rpm, the supernatant was removed, and approximately the same volume of methanol was added.

(5) The methanol solution including gelled DyF, DyFC, or DyFO clusters was stirred to form a complete suspension. The suspension was stirred by an ultrasonic stirrer for one hour or more.

(6) The procedures (4) and (5) were repeated three to ten times until no anions such as acetate ions and nitrate ions could be detected.

(7) In the case of DyF-based fluoride compound, almost transparent sol-like $DyF_x$ containing C and O was obtained. A 1 g/5 ml methanol solution of DyF was used as the treating solution.

(8) An organometal compound containing at least one element of the metal elements (i.e., elements selected from metal elements belonging to Groups 3 to 11 exclusive of rare earth elements, or elements belonging to Groups 2 and 12 to 16 exclusive of C and B) was added to an aliquot of the above-mentioned solution.

It was also possible to prepare the other coating solutions for forming rare earth fluoride, alkaline earth metal fluoride, and Group 2 metal fluoride coating films by substantially the same process as that mentioned above. Even when various elements were added to fluoride-based treating solutions containing rare earth element, alkaline earth element, or Group 2 metal element, such as Dy, Nd, La or, Mg there was observed no coincidence of diffraction patterns of each treating solution with the diffraction patterns of the fluoride compound or oxyfluoride compound represented by $RE_nF_m$ (where RE represents a rare earth element, a Group 2 metal element, or an alkaline earth metal element; n and m are positive integers), or $RE_nF_mO_pC_r$ (where RE represents a rare earth element, a Group 2 metal element, or an alkaline earth metal element; 0 represents oxygen; C represents carbon; F represents fluorine; n, m, p and r are each a positive integer) or of compounds with additive elements. The diffraction pattern of the solution or of a film obtained by drying the solution included a plurality of peaks each having a diffraction peak whose half-value width was 1 degree or larger. This indicated that the treating solution was different from $RE_nF_m$ in respect of an interatomic distance between the additive element and fluorine or between the additive element and the metal elements, and also in respect of the crystalline structure. The half-value width of the diffraction peak being 1 degree or larger indicated that the above-mentioned interatomic distance did not assume a constant value but had a certain distribution unlike an ordinary metal crystal having a constant interatomic distance. Such a distribution was formed due to presence of other atoms mainly including hydrogen, carbon, and oxygen, arranged differently from those in the above-mentioned compounds, around the atom of metal element or fluorine. The application of external energy such as heat caused the atoms of hydrogen, carbon, oxygen, etc. to easily migrate, resulting in a change in structure and fluidity of the treating solution. The X-ray diffraction patterns of the sol and the gel that included peaks having half-value widths larger than 1 degree underwent a structural change by heat treatment and some of the above-mentioned diffraction patterns of $RE_nF_m$ or $RE_n(F,O)_m$ came to appear. The half-value widths of these diffraction peaks were narrower than those of the diffraction peaks of the sol or gel. It is important for the diffraction pattern of the above-mentioned solution to include at least one peak having a half-value width of 0.5 degree or larger in order to increase the flowability of the solution (1) A preformed body ($10\times10\times10$ mm$^3$) of Nd—Fe—B sintered body or Nd—Fe—B magnetic particles were soaked in a treating solution for forming a DyF-based coating film and the soaked block was placed under a reduced pressure of 2 to 5 torr to remove the solvent methanol.

(2) The operation of Step (1) was repeated 1 to 5 times and the soaked preformed body was heated at a temperature of 400° C. to 1,100° C. for 0.5 to 5 hours.

(3) A pulsed magnetic field of 30 kOe or stronger was applied to the sintered magnet or the Nd—Fe—B-based magnetic particles provided with a surface coating film in the step (2) in the anisotropy direction.

A demagnetization curve of the magnetized sample was determined by placing the sample between the magnetic poles of a DC M-H loop measurement device such that the magnetization direction of the compact agreed with the direction of the applied magnetic field, and then applying the magnetic field between the magnetic poles. The magnetic pole pieces for the application of the magnetic field to the magnetized sample were made of a FeCo alloy. The values of magnetization were corrected using a pure Ni sample and a pure Fe sample, each having the same shape.

As a result, the block of Nd—Fe—B sintered body having the rare earth fluoride coating film formed thereon acquired an increased coercive force. By using the treating solutions to which the metal elements (i.e., elements selected from metal elements belonging to Groups 3 to 11 exclusive of rare earth elements, or elements belonging to Groups 2 and 12 to 16 exclusive of C and B) were added, the sintered body acquired a higher coercive force or squareness of the demagnetization curve than that of a sintered magnet obtained by coating and diffusing only heavy rare earth element fluoride containing no additive elements. An average value of concentrations of fluorine or carbon measured over an area of 100 µm$^2$ or more is 1±0.5 in terms of a ratio of the value measured at a depth of within 100 µm from the outermost surface of the block to the value measured at a central part at a distance of 100 µm or more from the outermost surface. Such a further increase of the coercive force or the squareness of the demagnetization curve which was already increased by the coating of the solution without additive elements and by the subsequent thermal treatment indicated that these additive elements contributed to the increase of coercive force. Near the element added to the solution, a short-range structure was observed due to the removal of the solvent. Further heating caused the element to diffuse together with the constituent element of the solution along the grain boundaries of the sintered magnet. The metal elements (i.e., elements selected from metal elements belonging to Groups 3 to 11 exclusive of rare earth elements, or elements belonging to Groups 2 and 12 to 16 exclusive of C and B) showed the tendency of segregating near grain boundaries together with some of the elements that constituted the solution. The sintered magnet exhibiting a high coercive force has a composition such that concentrations of elements that constitute the fluoride compound solution tend to be higher at the outer periphery portion of the magnet and lower at the central portion of the magnet. This is because the fluoride compound solution containing an additive element is coated and dried on the outer surface of the sintered magnet block in order to allow the fluoride or oxyfluoride containing the additive element having a short-range structure to grow and diffuse along the grain boundary vicinity. That is, there are observed concentration gradients or differences in concentration of fluorine and at least one of the metal elements (i.e., elements selected from metal elements belonging to Groups 3 to 11 exclusive of rare earth elements, or elements belonging to Groups 2 and 12 to 16 exclusive of C and B). Even when the transition metal element is added to any one of the fluoride, oxide, or oxyfluoride each containing at least one rare earth element in the form of slurry including pulverized powder of fluoride, improvements in magnetic properties, for example, higher coercive force as compared with the case where no transition metal elements are added can be confirmed. However, the effect of improving the magnetic properties, such as the effect of improving coercive force, is remarkable when at least one of the transition metal elements and semimetal elements is added to the transparent solution. When a film containing a heavy rare earth element such as Dy is formed by vapor deposition or sputtering, vapor deposition or sputtering of an evaporation source mixed with a metal element selected from elements belonging to Groups 3 to 11 exclusive of transition metal elements and rare earth elements, or elements belonging to Groups 2 and 12 to 16 exclusive of C and B manifests improvements in magnetic properties as compared with the case where only heavy rare earth elements are used. Treatment with solutions is more remarkable. This is because the transition metal elements and semimetal elements are dispersed in the fluoride compound solution on the order of atoms and the transition metal elements or semimetal elements in the fluoride film have short-range structures and are dispersed uniformly. These elements can be dispersed at low temperatures along the grain boundaries together with the elements that constitute the solution, such as fluorine. The metal elements (elements belonging to Groups 2 to 16 excluding rare earth elements and C and B) and the additive elements have any of the following roles: 1) to reduce an interface energy by being segregated near a grain boundary; 2) to increase the lattice matching of a grain boundary; 3) to reduce defects at a grain boundary; 4) to promote grain boundary diffusion of the rare earth element and the like; 5) to increase a magnetic anisotropic energy near a grain boundary; 6) to smooth the interface with the fluoride compound, the oxyfluoride compound, or the carbide oxyfluoride compound; 7) to increase anisotropy of a rare earth element; 8) to remove oxygen from the matrix; 9) to raise the Curie temperature of the matrix; 10) to change the electronic structure of the grain boundary by being combined with other elements that segregate in the grain boundary, i.e., allowing the amount of heavy rare earth element to be decreased by 1 to 50% by use of additive elements; 11) to allow oxyfluoride or fluoride containing one or more additive elements to be formed on the surface of the sintered magnet block to a thickness of 1 to 10,000 nm, thereby contributing to an improvement in anticorrosion or an increase in resistance; 12) to promote segregation of elements added to the sintered magnet in advance; 13) to diffuse oxygen in the matrix into grain boundaries to achieve reduction action or allow the additive element to combine with oxygen to reduce the matrix; 14) to promote regularization of the grain boundary phase, with some of additive elements remaining in the grain boundary phase; 15) to suppress the growth of the phase containing fluorine in grain boundary triple areas; 16) to sharpen the concentration distribution of heavy rare earth elements or fluorine atoms in the grain boundaries and the interface of the matrix; 17) to decrease liquid phase-forming temperature near the grain boundaries by diffusion of fluorine, carbon or oxygen, and additive elements; 18) to increase magnetic moment of the matrix due to grain boundary segregation of fluorine and additive elements; and 19) to promote grain boundary diffusion at low temperatures of heavy rare earth elements and allow to suppress the growth of a phase that decreases remnant flux density such as a phase containing a large amount of a rare earth element other than the matrix and boride. As a result, there was obtained any one of the following advantageous effects: an increase in coercive force, an improvement in squareness of a demagnetization curve, an increase in residual magnetic flux density, an increase in energy product, an increase in Curie temperature, a decrease in magnetization magnetic field, a decrease in dependence of coercive force and residual magnetic flux density on temperature, an improvement in corrosion resistance, an increase in specific resistance, a decrease in heat demagnetization rate, and an improvement in anticorrosion. The metal elements (elements belonging to Groups 2 to 16 exclusive of rare earth elements and C and B) that are added to the solution and diffused therein are prone to be segregated either in the grain boundary phase or at the edge of the grain boundary, or outer peripheral part (grain boundary side) in the grain as seen from the grain boundary toward inside of the grain. These additive elements are applied by using their solution and heated to diffuse, so that they tend to be in high concentrations near the grain boundaries where fluorine or the main component of the fluoride compound solution is segregated unlike the composition distribution of the elements that have been added to the sintered magnet in advance. In the grain boundaries where fluorine is segregated in low concentrations, segregation of the elements that have been added in advance is observed and provides an average concentration gradient from the outermost surface to the inside of the magnet block. As described above, when a magnet block was coated with a solution including an additive element, and then heated for improvement of the characteristics of a sintered magnet, the sintered magnet thus obtained exhibited the following characteristics. 1) A concentration gradient or an average concentration difference of the transition metal element is observed from the outermost surface of the sintered magnet toward the inside thereof; 2) The segregation of the metal element (elements belonging to Groups 2 to 16 exclusive of rare earth elements and C and B) along with fluorine is observed near the grain boundaries of the magnet part, which indicates that there is relationship or correlation between the concentration distribution of fluorine and the concentration distribution of additive element. 3) The concentration of fluorine is high in the grain boundary phase and low outside the grain boundary phase, the segregation of the metal elements (elements belonging to Groups 2 to 16 exclusive of rare earth elements and C and B) is observed near a region where a difference in fluorine concentration is observed, and an average concentration gradient or concentration difference is observed from the surface of the magnet block to the inside thereof. 4) A layer containing one or more metal elements (elements belonging to Groups 2 to 16 exclusive of rare earth elements and C and B), fluorine, and carbon grows on the outermost surface of the sintered magnet. 5) The concentration gradient of the additive element that has been added before the treatment with the solution and the concentration gradient of the element added by the treatment with the solution differ from each other. The former does not depend on the concentration of the main component of the fluoride compound solution, such as fluorine while the latter shows a strong correlation or correlativity in concentration profile with at least one element among the elements that constitute the fluoride compound solution.

TENTH EMBODIMENT

A series of coating compositions for forming a rare earth fluoride or alkaline earth metal fluoride coating film was prepared in the following manner.

(1) In the case of a salt having high solubility in water, for example, Nd, 4 g Nd acetate or Nd nitrate was introduced in 100 ml water, and the resultant mixture was completely dissolved by using a shaker or an ultrasonic mixer.

(2) Hydrofluoric acid diluted to 10% was gradually added to the obtained solution by an amount equivalent for a chemical reaction to prepare $NdF_xC_y$ (where x and y are positive integers, respectively).

(3) The solution in which gelled $NdF_xC_y$ (where x and y are positive integers, respectively) had been precipitated was stirred by an ultrasonic stirrer for 1 hour or more.

(4) After centrifuging at 4,000 to 6,000 rpm, the supernatant was removed, and approximately the same volume of methanol was added.

(5) The methanol solution including gelled NdFC clusters was stirred to form a complete suspension. The suspension was stirred by an ultrasonic stirrer for one hour or more.

(6) The procedures (4) and (5) were repeated three to ten times until no anions such as acetate ions and nitrate ions were detected.

(7) In the case of NdFC-based fluoride compound, almost transparent sol-like $NdF_xC_y$ (where x and y are positive integers, respectively) was obtained. A 1 g/5 ml methanol solution of $NdF_xC_y$ (where x and y are positive integers, respectively) was used as the treating solution.

(8) The organometal compounds shown in Table 1 exclusive of carbon (C) were added to respective aliquots of the above-mentioned solution.

It was also possible to prepare the other coating solutions for forming coating films consisting mainly of rare earth fluoride or alkaline earth metal fluoride by substantially the same process as that mentioned above. Even when various elements were added to Dy, Nd, La, Pr fluoride-based treating solutions containing rare earth element, alkaline earth element, or Group 2 metal element, the diffraction patterns of the treating solutions did not coincide with the diffraction patterns of the fluoride compound or oxyfluoride compound represented by $RE_nF_mC_P$ (where RE represents a rare earth element, or an alkaline earth metal; n, m and p are positive integers, respectively). So far as the contents of the additive elements were within the range shown in Table 1, the structure of the resulting solution was not changed considerably. The diffraction pattern of the solution or of a film obtained by drying the solution included a plurality of peaks each having a diffraction peak whose half-value width was 1° or larger. This indicated that the treating solution was different from $RE_nF_mC_p$ in respect of an interatomic distance between the additive element and fluorine or between the additive element and the metal elements, and also it was different from $RE_n$-$F_mC_p$ in respect of the crystalline structure. The half-value width of the diffraction peak being 1 degree or larger indicated that the above-mentioned interatomic distance did not assume a constant value but had a certain distribution unlike ordinary metal crystals having a constant interatomic distance. Such a distribution was formed due to presence of other atoms mainly including hydrogen, carbon, and oxygen around the atom of metal element or fluorine. The application of external energy such as heat caused the atoms of hydrogen, carbon, oxygen, etc. to easily migrate, resulting in a change in structure and fluidity of the treating solution. The X-ray diffraction patterns of the sol and the gel that included peaks having half-value widths larger than 1° underwent a structural change by heat treatment and some of the above-mentioned diffraction patterns of $RE_nF_mC_p$ or $RE_n(F,O,C)_m$ (where ratios of F, O, and C are optional) came to appear. It would be conceivable that most of the additive elements listed in Table 1 do not have any long period structure in the solution. The half-value widths of these diffraction peaks of $RE_nF_mC_p$ are narrower than those of the diffraction peaks of the sol or gel. It is important for the diffraction pattern of the above-mentioned solution to include at least one peak having a half-value width of 1 degree or larger in order to increase the flowability of the solution. Such a peak having a half-value width of 1 degree or larger and the diffraction pattern of $RE_nF_mC_p$ or the peak of oxyfluoride compound may be included. When only the diffraction patterns of $RE_nF_mC_p$ or oxyfluoride compound, or mainly the diffractive patterns having a half-value width of 1 degree or smaller are observed, a solid phase, which is different from sol or gel, is mixed in the solution, so that the solution has poor solubility and is difficult to coat.

(1) A block ($10\times10\times10$ mm$^3$) of Nd—Fe—B preformed body was soaked in a treating solution for forming an NdF-based coating film and the soaked block was placed under a reduced pressure of 2 to 5 torr to remove methanol used as a solvent.

(2) The operation of Step (1) was repeated 1 to 5 times and the soaked preformed body was heated at a temperature of 800° C. to 1,000° C. for 0.5 to 5 hours.

(3) A pulsed magnetic field of 30 kOe or stronger was applied to the anisotropic magnet provided with a surface coating film in the step (2) in the anisotropy direction.

A demagnetization curve of the magnetized sample was determined by placing the sample between the magnetic poles of a DC M-H loop measurement device such that the magnetization direction of the compact agreed with the direction of the applied magnetic field, and then applying the magnetic field between the magnetic poles. The magnetic pole pieces for the application of the magnetic field to the magnetized sample were made of a FeCo alloy. The values of magnetization were corrected using a pure Ni sample and a pure Fe sample, each having the same shape. Analysis of the sintered body by wavelength dispersive X-ray spectroscopy indicated that an average concentration of fluorine or carbon measured over an area not smaller than 100 µm$^2$ is such that a ratio of a value measured in an area within 100 µm from an outermost surface of the ferromagnetic material to a value measured in an area including a central part at a distance of not smaller than 100 µm from the outermost surface is 1±0.5.

Figure 2:
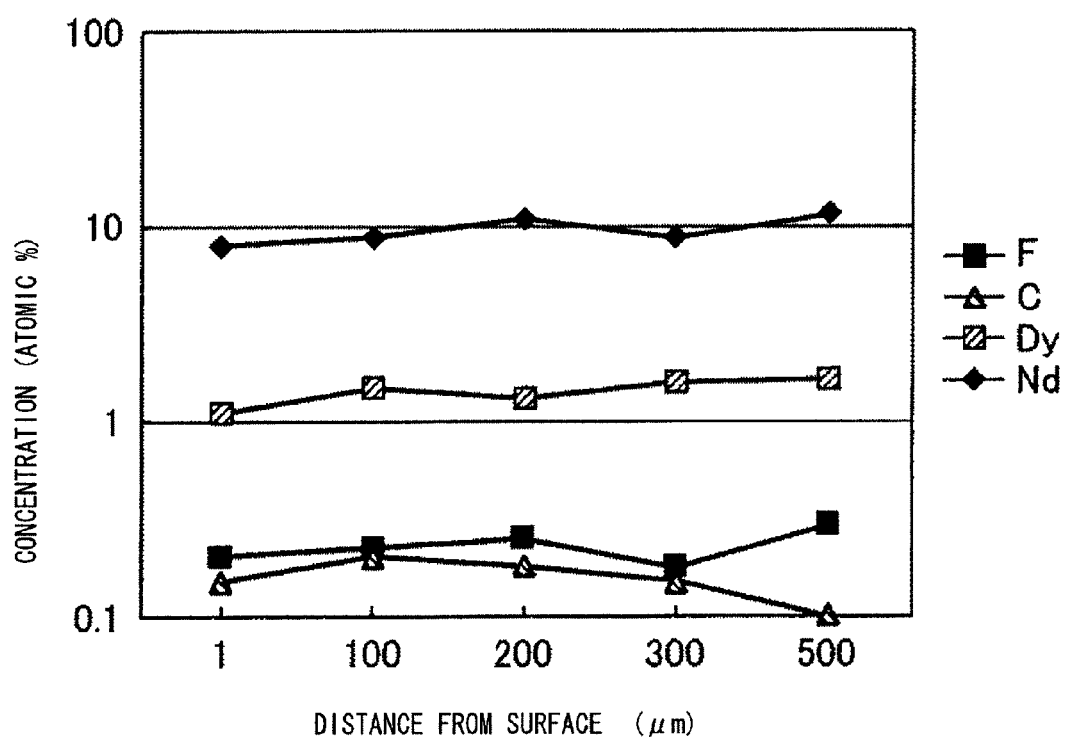
FIG. 2 shows an example of concentration distribution on a cross-section of a second example of a sintered magnet according to the present invention.
Figure 3:
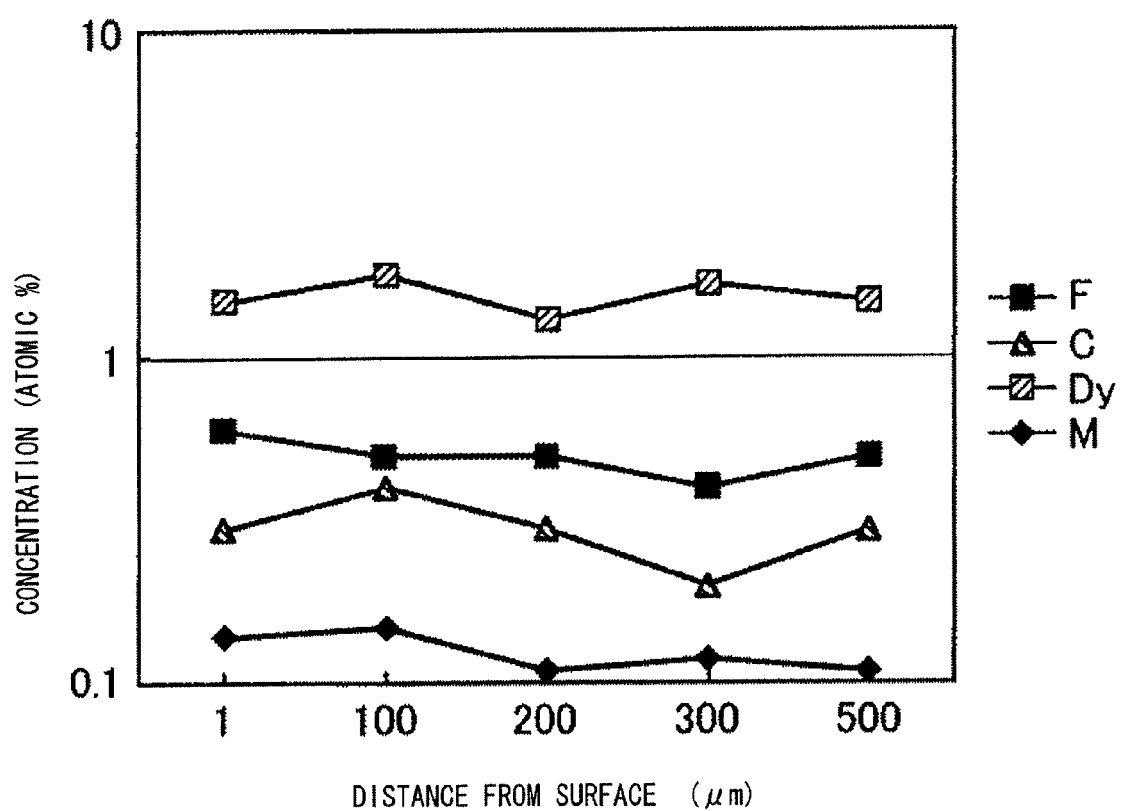
FIG. 3 shows an example of concentration distribution on a cross-section of a third example of a sintered magnet according to the present invention.
Figure 4:
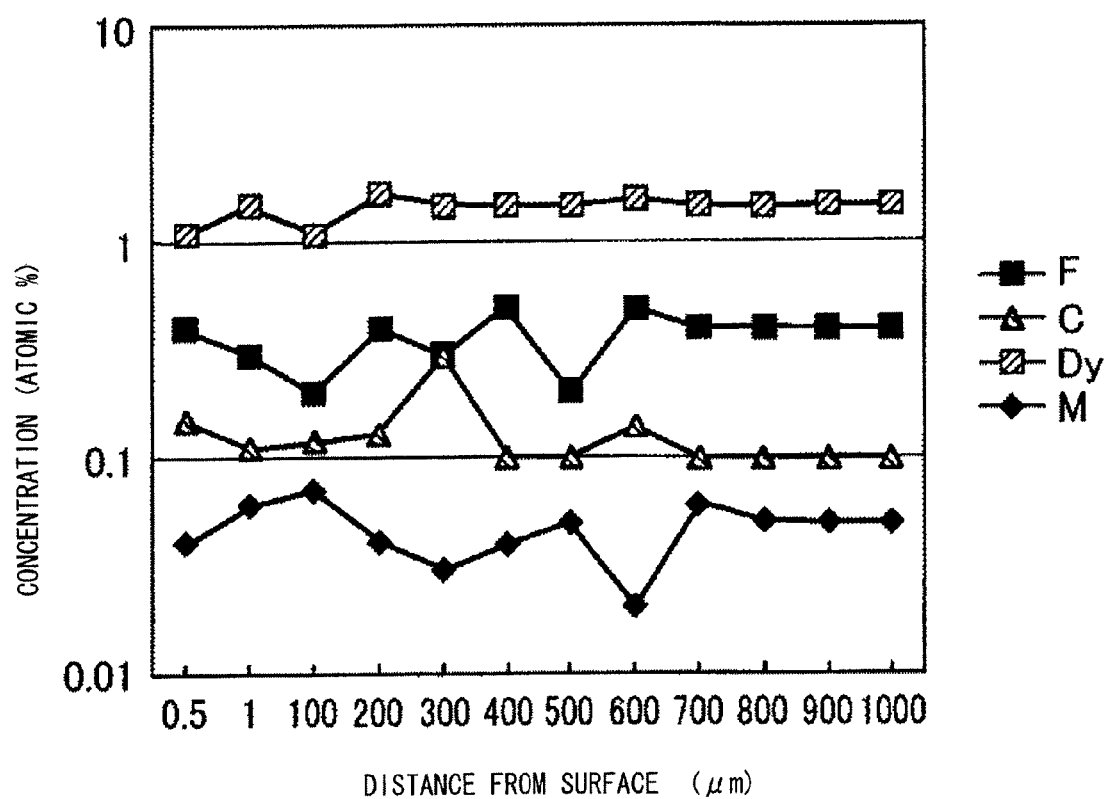
FIG. 4 shows an example of concentration distribution on a cross-section of a fourth example of a sintered magnet according to the present invention.
Figure 5:
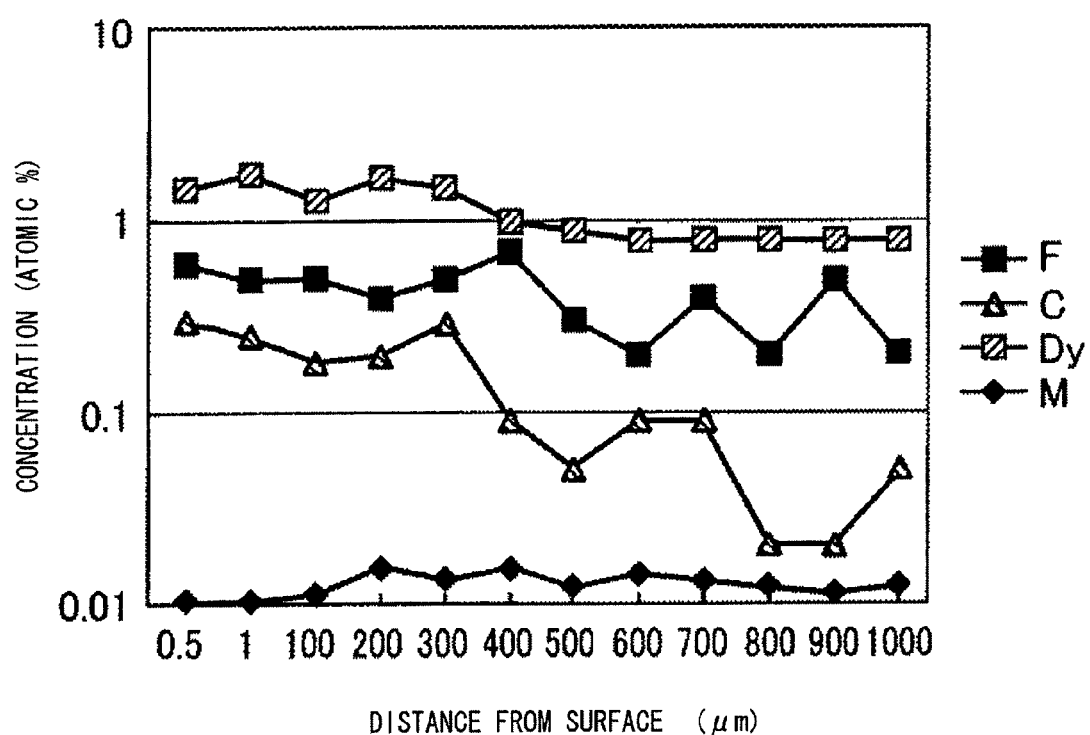
FIG. 5 shows an example of concentration distribution on a cross-section of a fifth example of a sintered magnet according to the present invention.
Figure 6:
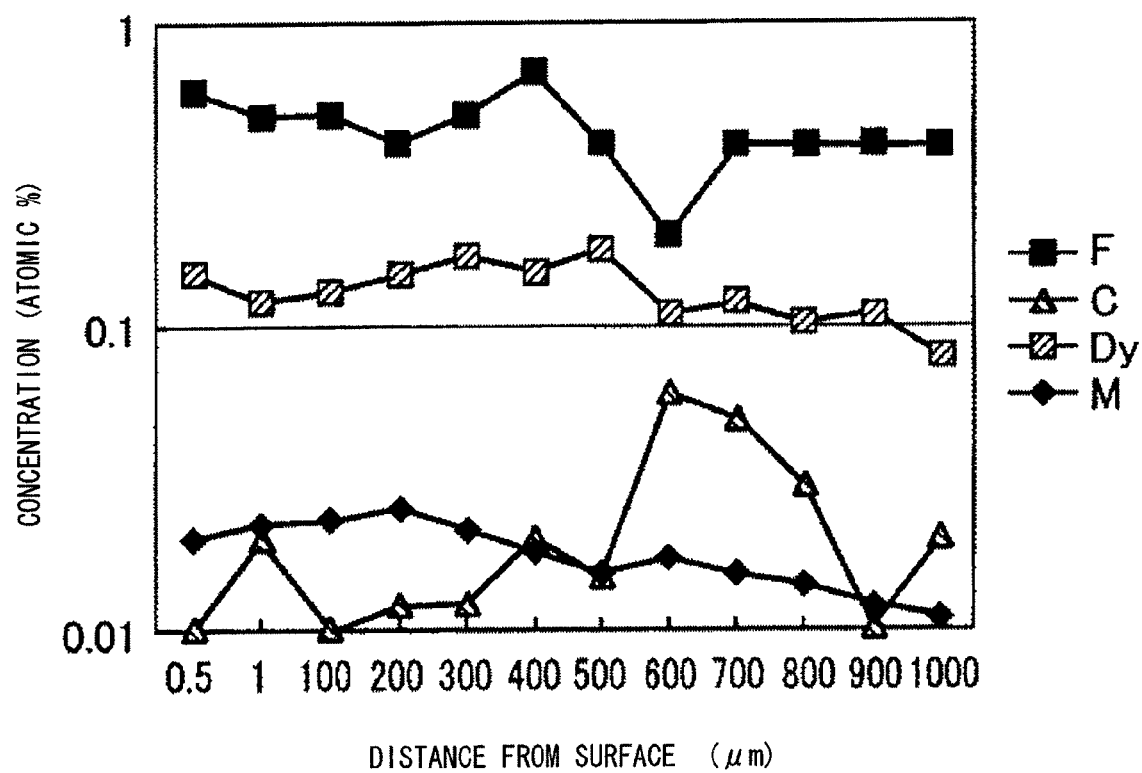
FIG. 6 shows an example of concentration distribution on a cross-section of a sixth example of a sintered magnet according to the present invention.

As a result, the coercive force of the block of the Nd—Fe—B sintered compact having formed thereon the rare earth fluoride coat film increased. That is, sintered magnets in which the Dy, Nd, La, and Pr carbide fluoride compounds or the Dy, Nd, La, and Pr carbide oxyfluoride compounds were segregated had coercive forces that were higher by 40%, 30%, 25%, and 20%, respectively, than the sintered magnet in which no additive elements were contained. The additive elements listed in Table 1 were added to respective fluoride compound solutions by using corresponding organometal compounds in order to further increase the coercive force that had been increased by the coating and heat treatment of the additive elements-free solution. It turned out that the additive elements further increased the coercive force of the sintered magnet as compared with the coercive force of the additive elements-free solution as a standard and that the additive elements contributed to an increase in coercive force. A short range structure was observed near the added elements as a result of the removal of the solvent and further heat treatment resulted in diffusion of the added elements together with the elements that constituted the solution along the surface of the grain boundaries or various defects of the sintered magnet. These additive elements showed the tendency of segregating in areas near the grain boundaries together with some of the elements that constituted the solution. The additive elements listed in Table 1 diffused as attended with at least one element of fluorine, oxygen, and carbon in the sintered magnet and remained in areas near the grain boundaries. The sintered magnet exhibiting a high coercive force has a composition such that concentrations of elements that constitute the fluoride compound solution tend to be higher at outer periphery portion of the magnet and lower at the central portion of the magnet. This is because the fluoride compound solution containing an additive element is coated and dried on the outer surface of the sintered magnet block in order to allow the fluoride or oxyfluoride containing the additive element having a short-range structure to grow and diffuse along the vicinity of grain boundary, cracked portion or defected portion. The concentration distributions from the surface to the inside of the sintered magnets are shown in FIGS. 1 to 6. FIGS. 1 and 2 relate to the cases where no transition metal element is added to the fluoride compound solution. Fluorine is more abundant than Dy on the surface of the sintered magnet and the content of fluorine is smaller than that of Dy in the inside of the sintered magnet. This is because a fluoride compound or oxyfluoride compound containing Nd or Dy grows near the outermost surface of the sintered magnet. As shown in FIG. 2, concentration gradient of carbon is observed. Near the surface of the sintered magnet, a carbide fluoride compound or carbide oxyfluoride compound grows in some parts. FIGS. 3 to 6 illustrate results of measurement of concentration distribution of transition metal element M (here, Cu). A ratio of Dy, one of heavy rare earth elements, to fluorine is not so different between the inside and the surface of the sintered magnet. No peak is observed which indicates that fluorine is very much on the surface. FIG. 3 shows that the concentration of fluorine is lower than the concentration of Dy on the surface and the concentration of element M, which is an element listed in Table 1 excluding carbon, is lower than that of carbon. The concentration distributions of carbon and transition metal elements containing elements listed in Table 1 show a decrease in concentration in some locations from the outer periphery to the inside. The concentration distributions shown in FIG. 4 relate to the cases where a reaction layer is formed between the fluoride and matrix and there are minimums in the concentration distributions of Dy and M element. In the minimum part of the Dy concentration, much Nd is detected and exchange reaction between Nd and Dy occurs. This would give rise to the concentration distribution as shown in FIG. 4. In some portions from the outer periphery to the inside, there are observed decreases in concentrations of fluorine, carbon, and transition metal elements. In some cases, there may be concentration distributions with minimum or maximum as influenced by the reaction layer. In FIG. 5, there are observed concentration distributions of fluorine, Dy, and carbon from the surface. The maximum value in the concentration distribution of Dy is no smaller than ½ times the value at the surface. Therefore, by performing impregnation processing, the concentration distribution of Dy as evaluated in an average value on a side of 100 μm square is such that the maximum value at the central portion is 1 to 0.5 times the value at the surface, thus providing a concentration distribution different from grain boundary diffusion. In addition, there are locations where the concentration of carbon is higher than the surface as shown in FIG. 6. Diffusion of carbon contained in an impregnation liquid upon impregnation results in a local high concentration. Such tendencies of concentration distributions shown in FIGS. 1 to 6 are observed not only in sintered magnets but also in Nd—Fe—B magnetic powder and powder containing rare earth elements and improvements in magnetic characteristics are confirmed. There are observed a concentration distribution or a concentration gradient of fluorine and at least one element selected from metal elements of Group 3 to 11 or elements of Group 2 and Groups 12 to 16 including additive elements listed in Table 1. The concentration of rare earth element contained in the fluoride compound solution as expressed in an average concentration integrated over an area of 100 μm square is such that a ratio of the result at 1 to 101 μm from the surface to the result at a depth of 1,000 μm is within 2 times. When the concentration of the additive element is adjusted to 1,000 times or more the concentration described in Table 1, there is observed a tendency that the structure of the fluoride compound that constitutes the solution is changed and the distribution of the additive element in the solution becomes non-uniform to inhibit diffusion of other elements, so that it becomes difficult to segregate the additive element along grain boundaries toward the inside of the magnet block although an increase in a coercive force is locally observed. The role of metal elements of Groups 3 to 11 or additive elements of Group 2 and Groups 12 to 16 exclusive of B is any one of the following roles: 1) to segregate additive elements in the grain boundary vicinity and decrease the surface energy; 2) to improve lattice match at the grain boundary; 3) to reduce defects at the grain boundary; 4) to promote grain boundary diffusion of the rare earth element etc.; 5) to increase magnetic anisotropic energy in the grain boundary vicinity; 6) to smooth interface with the fluoride compound or the oxyfluoride compound; and 7) to allow growth of a phase that has excellent anticorrosive property, contains the additive element and has concentration gradient of fluorine on the outermost surface, thereby increasing stability (adhesion) as a protective film due to contents of iron and oxygen. In a part of the outermost surface layer, there are found twinned crystals. As a result, there is obtained by impregnation coating and diffusion by heat treatment, either one of the following advantageous effects. That is, there is observed either one of an increase in coercive force, improvement of squareness of demagnetization curve, an increase in residual magnetic flux density, an increase in energy product, an increase in Curie temperature, a decrease in magnetization magnetic field, a decrease in dependence of coercive force and residual magnetic flux density on temperature, an improvement of corrosion resistance, an increase in specific resistance, or a decrease in heat demagnetization rate. The concentration distributions of metal elements of Groups 3 to 11 or the additive elements of Group 2 and Groups 12 to 16 exclusive of B show the tendency that the concentrations of the additive element decrease from the outer periphery to the inside of a crystal grain averagely, becoming a high concentration in the grain boundary part or in the outermost surface. The width of the grain boundary tends to differ between the grain boundary triple area and a site remote from the grain boundary triple area, with the grain boundary triple areas vicinity having a larger width than the site remote from the grain boundary triple area. An average width of the grain boundary is 0.1 to 20 nm. A portion of the additive elements segregates within a distance of 1 to 1,000 times the width of the grain boundary. The concentration of the additive element that segregated shows the tendency that it decreases averagely from the surface to the inside of the magnet. Fluorine is present in a part of the grain boundary phase. The additive elements are prone to be segregated either in the grain boundary phase or at the edge of the grain boundary, or outer peripheral part (grain boundary side) in the grain as seen from the grain boundary toward inside of the grain. The additives in the solution of which the effect of improving the magnetic properties of the above-mentioned magnet is confirmed include an element selected from among elements having an atomic number of 18 to 86 including Mg, Al, Si, Ca, Ti, V, Cr, Mn, Fe, Co, Ni, Cu, Zn, Ga, Ge, Sr, Zr, Nb, Mo, Pd, Ag, In, Sn, Hf, Ta, W, Ir Pt, Au, Pb, and Bi shown in Table 1 and all the transition metal elements. At least one of these elements and fluorine shows concentration gradients changing averagely from the outer periphery toward the inside and from the grain boundary toward the inside of grain of the sintered magnet. The concentration gradients or differences in concentration of metal elements of Groups 3 to 11 or the additive elements of Group 2 and Groups 12 to 16 exclusive of B show the tendency that they averagely change from outer periphery to the inside of the magnet and become smaller toward the center of the magnet. When diffusion is sufficient, differences in concentration of additive elements accompanying segregation of the additive elements are observed near the grain boundaries containing fluorine. These additive elements used in the form of solutions are heated and diffused after the processing and hence they have high concentrations near the grain boundaries in which fluorine segregates unlike the compositional distribution of the elements added to the magnet in advance. Near the grain boundaries where less segregation of fluorine occurs, there is observed segregation of the elements added in advance, appearing as an average concentration gradient from the outermost surface to the inside of the magnet block. Even when the concentration of the additive element is low in the solution, there is observed a difference in concentration between the outermost surface of the magnet and the central part of the magnet, so that it is confirmed as a concentration gradient or a difference in concentration between the grain boundary and the inside of grain. The difference in concentration of an element contained in the solution is such that a ratio of the concentration of the element contained in the solution in a thickness of 0.1 mm or more at the central portion of the magnet to the concentration of the element contained in the solution at the outer periphery in a thickness of 0.1 mm or more is within 2 times as an average concentration over 100 µm square. As mentioned above, when the solution to which the additive element had been added was applied to a magnet block by impregnation and the impregnated magnet block was heated to improve the magnetic properties of the resultant sintered magnet, the magnet had the following features. 1) The concentration gradient or the average concentration difference of elements having atomic numbers of 18 to 86 including the elements listed in Table 1 or the transition metal elements is observed along a direction of from the outermost surface to the inside of the sintered magnet including a reaction layer with a layer containing fluorine. The difference in concentration averaged over 100 µm square is 2 times or less. 2) In a lot of parts, the segregation near the grain boundary of one or more of the elements having atomic numbers of 18 to 86 including the elements listed in Table 1 or the transition metal elements occurs as accompanied by fluorine, carbon, or oxygen. 3) The concentration of fluorine is higher in the grain boundary phase and lower on the outside of the grain boundary phase (crystal grain outer periphery portion). Segregation of one or more of the elements listed in Table 1 or elements having atomic numbers of 18 to 86 occurs in a region of width within 1,000 times the grain boundary width where a concentration difference of fluorine is observed, and local concentration gradient or concentration difference is observed from the surface of the magnet block to the inside of the magnet. 4) The concentrations of fluorine and additive elements are highest on the outermost surface of or the inside of the sintered magnet block or magnetic particles or ferromagnetic particles coated with the solution, and there are observed concentration gradients or concentration differences of the additive elements from outer part toward the inside of the magnetic body. 5) On the outermost surface, there is formed a layer having a thickness of 1 to 10,000 nm that contains fluorine, carbon, oxygen, iron, and one or more elements listed in Table 1 or one or more elements having an atomic number of 18 to 86 in a coverage of 10% or more, preferably 50% or more. The layer contributes to improvement of anticorrosion and recovery of magnetic property and so on. 6) At least one of the elements that constitute the solution including the additive element listed in Table 1 or elements having an atomic number of 18 to 86 has a concentration gradient from the surface toward the inside of the magnet block and the layer that has grown from the solution has a maximum concentration of fluorine near the boundary face between the magnet and the fluorine-containing film or a part outside the grain boundary as seen from the magnet. The fluoride compound near the boundary face contains oxygen or carbon, or one or more elements having an atomic number of 18 to 86, which contributes to either of high corrosion resistance or high electrical resistance, or high magnetic properties. In this fluorine containing film, there is detected at least one element from among the additive elements listed in Table 1 and the elements having an atomic number of 18 to 86. The above-mentioned additive elements are contained in higher concentrations near the impregnation paths of fluorine in the magnet than in other portions, and there is observed any one of the effects including an increase in coercive force, an improvement in squareness of demagnetization curve, an increase in residual magnetic flux density, an increase in energy product, an increase in Curie temperature, a decrease in magnetization field, a decrease in dependence of coercive force and residual magnetic flux density on temperature, an improvement in corrosion resistance, an increase in specific resistivity, a decrease in heat demagnetization rate, a decrease in diffusion temperature, inhibition of growth of grain boundary width, and inhibition of growth of nonmagnetic layer in the grain boundary portion. The concentration difference of the above-mentioned additive element or elements can be confirmed by analyzing a sample of a sintered block cut from the surface side to the inside by EDX (energy dispersive x-ray) profile of a transmission electron microscope, EPMA (electron probe micro-analysis), Auger analysis, or the like. It can be analyzed by EDX of the transmission electron microscope or EELS (electron energy-loss spectroscopy) of a transmission electron microscope such that the element or elements having an atomic number of 18 to 86 added to the solution segregate near the fluorine atoms (for example, within 5,000 nm, preferably within 1,000 nm from the position where the segregation of the fluorine atom occurs). A ratio of additive elements that segregated near fluorine atoms to the additive elements segregated at a position 2,000 nm distant from the position of segregation of fluorine atoms is 0.5 to 1,000 at a position by 100 µm inward from the surface of the magnet. The additive elements can be present either as continuous segregation or as discontinuous segregation and does not always segregate over the grain boundary in whole. In the center side of the magnet, the additive elements tend to be discontinuous. A part of the additive elements does not segregate but averagely enters the matrix. The additive elements having an atomic number of 16 to 86 show the tendency that the ratio of the portion that diffused in the matrix from the surface to the inside of the sintered magnet or the concentration of the additive element that segregates near the position at which fluorine segregates decreases. Due to this concentration distribution, there is observed a tendency that the coercive force is higher at a position near the surface than the inside of the magnet. As for the effects of improving magnetic properties, the effects of improving hard magnetic properties, increasing electric resistance of magnetic particle, and so on can be obtained by forming a film containing fluorine and additive elements using the solutions listed in Table 1 not only on sintered magnet block but also on the surfaces of Nd—Fe—B magnetic particles, SmCo magnetic particles, or Fe magnetic particles and then performing diffusion heat treatment.

ELEVENTH EMBODIMENT

An SmFeF sintered magnet containing an $Sm_2Fe_{17}Fx$ (x=0.2 to 5.0) structure as a main phase is fabricated and ground and is bonded with a laminate electromagnetic steel plate, a laminate amorphous material or crushed iron powder to fabricate a rotor, the laminate electromagnetic steel plate or crushed iron powder is worked using a mold or the like at a position where a magnet is to be inserted. $Sm_2Fe_{17}Fx$ (x=0.2 to 5.0) is prepared by forming $SmF_{2-3}$ on the surface of particles having an average particle size of 0.1 to 1 µm by solution treatment to a thickness of 1 to 100 nm and heat treatment at 200 to 800° C., preforming and then partially sintering at a temperature higher than the heat treatment temperature. The fluoride compound after the solution treatment has a high-dimensional structure. By heat treatment, microcrystals having a particle size of 10 to 30 nm grow from a high-dimensional structure similar to an amorphous material and at the same time fluorination of the matrix proceeds to form a concentration gradient of fluorine from the outside toward the central part of the magnetic particle. The difference in concentration of fluorine differs by 10% or more between the outer periphery side and the central part, and fluorine diffuses and coercive force, remnant flux density or squareness is improved. When fluorine atoms reach the central part, improvements in magnetic properties are saturated. Such an $Sm_2Fe_{17}Fx$ (x=0.2 to 5.0) has a tetragonal or cubic structure having a surface separation of 1.5 to 2.5 angstroms and an anisotropy in its atomic arrangement. When the sintered magnet is inserted at an insertion position, a gap of 0.01 to 0.5 mm is provided between the sintered magnet and the laminate electromagnetic steel plate or compacted powder. At positions of magnets including such gaps, sintered magnets having various forms such as rectangular form, a ring form, a curved form such as a hog-backed form are inserted, and a gel- or sol- or cluster-like PrF solution is injected into the gaps. The resultant is heated at a temperature not lower than 100° C. and the sintered magnets are bonded to the laminate electromagnetic steel, the laminate amorphous material or the compacted powder. On this occasion, by a further heat treatment at a temperature of 500° C. or higher, Pr or fluorine can be diffused on the surface of the magnet and elements that constitute the fluoride compound are diffused also on the surface the laminate electromagnetic steel or compacted powder, so that the magnetic properties (an increase in coercive force, an improvement in squareness, an improvement in demagnetization resistance, an increase in Curie temperature and so on) of the sintered magnet are improved to strengthen the bonding. It is possible to improve the magnetic properties of a curved working-denatured layer, which has been denatured by working, and the diffusion layer composed mainly of fluorine or rare earth elements on the surface or grain boundary of each magnetic material may contain light elements such as oxygen and carbon or at least one of Mn, Ga, Cu, Ti, Al, Fe, and Co. While the above-mentioned fluoride compound is caused to contain a rare earth element in order to improve the magnetic properties of the sintered magnet, a fluoride compound containing a rare earth element, or an alkali element or an alkaline earth element may be used in order to improve effects other than the improvement in the magnetic properties of the sintered magnet, such as effects of bonding, removal of magnetic strain or a reduction in loss.

TWELFTH EMBODIMENT

An SmFeF sintered magnet containing an $Sm_2Fe_{19}Fx$ (x=0.2 to 5.0) structure as a main phase is fabricated and ground and is bonded with a laminate electromagnetic steel plate, a laminate amorphous material or crushed iron powder to fabricate a rotor, the laminate electromagnetic steel plate or crushed iron powder is worked using a mold or the like at a position where a magnet is to be inserted. $Sm_2Fe_{19}Fx$ (x=0.2 to 5.0) is prepared by forming $SmF_{2-3}$ on the surface of particles having an average particle size of 0.1 to 1 μm by solution treatment to a thickness of 1 to 100 nm and heat treatment at 200 to 800° C., preforming and then sintering at a temperature higher than the heat treatment temperature. The fluoride compound after the solution treatment has a high-dimensional structure. By heat treatment, microcrystals having a particle size of 10 to 30 nm grow from a high-dimensional structure similar to an amorphous material and at the same time fluorination of the matrix proceeds to form a concentration gradient of fluorine from the outside toward the central part of the magnetic particle. The difference in concentration of fluorine differs by 10% or more between the outer periphery side and the central part, and fluorine diffuses and coercive force, remnant flux density or squareness is improved. When fluorine atoms reach the central part, improvements in magnetic properties are saturated. Such an $Sm_2Fe_{19}Fx$ (x=0.2 to 5.0) has a tetragonal or cubic structure having a surface separation of 1.5 to 2.5 angstroms and an anisotropy in its atomic arrangement. When the sintered magnet is inserted at an insertion position, a gap of 0.01 to 0.5 mm is provided between the sintered magnet and the laminate electromagnetic steel plate or compacted powder. At positions of magnets including such gaps, sintered magnets having various forms such as rectangular form, a ring form, a curved form such as a hog-backed form are inserted, and a gel- or sol- or cluster-like PrF solution is injected into the gaps. The resultant is heated at a temperature not lower than 100° C. and the sintered magnets are bonded to the laminate electromagnetic steel, the laminate amorphous material or the compacted powder. On this occasion, by a further heat treatment at a temperature of 500° C. or higher, Pr or fluorine can be diffused on the surface of the magnet and elements that constitute the fluoride compound are diffused also on the surface the laminate electromagnetic steel or compacted powder, so that the magnetic properties (an increase in coercive force, an improvement in squareness, an improvement in demagnetization resistance, an increase in Curie temperature, an increase in electric resistance, an increase in magnetic heat absorption or magnetic refrigerating effect and so on) of the sintered magnet are improved to strengthen the bonding. It is possible to improve the magnetic properties of a curved working-denatured layer, which has been denatured by working, and the diffusion layer composed mainly of fluorine or rare earth elements on the surface or grain boundary of each magnetic material may contain light elements such as oxygen and carbon or at least one of Mn, Ga, Cu, Ti, Al, Fe, Co, Zr, and V. Instead of Sm in $Sm_2Fe_{19}Fx$ (x=0.2 to 5.0), other light rare earth elements may be used. The ratio of Sm to Fe may be 2:17, 2:21, 2:23 and so on as well as 2:19. When Sm/Fe is smaller than 2/17, it is possible to prepare a ferromagnetic compound containing fluorine. Co may be used instead of Fe. Near the grain boundaries, there may be a mixed phase consisting of a phase in which fluorine is abundant and a phase in which fluorine is less abundant due to diffusion accompanied by interchange between the rare earth elements. A rare earth element is caused to be contained in the fluoride compound for the improvement of magnetic properties of the sintered magnet. However, a fluoride compound containing a rare earth element, or an alkali element or an alkaline earth element may be used in order to improve effects other than the improvement in the magnetic properties of the sintered magnet, such as effects of bonding, removal of magnetic strain or a reduction in loss.

THIRTEENTH EMBODIMENT

An SmFeF sintered magnet containing an $Sm_2Fe_{17}Fx$ (x=0.2 to 5.0) structure as a main phase is fabricated and ground and is bonded with a laminate electromagnetic steel plate, a laminate amorphous material or crushed iron powder to fabricate a rotor, the laminate electromagnetic steel plate or crushed iron powder is worked using a mold or the like at a position where a magnet is to be inserted. $Sm_2Fe_{17}Fx$ (x=0.2 to 5.0) is prepared by forming $SmF_{2-3}$ on the surface of particles having an average particle size of 0.1 to 1 μm by solution treatment to a thickness of 1 to 100 nm and heat treatment at 200 to 800° C., preforming and then sintering at a temperature higher than the heat treatment temperature. The fluoride compound after the solution treatment has a high-dimensional structure. By heat treatment, microcrystals having a particle size of 10 to 30 nm grow from a high-dimensional structure similar to an amorphous material and at the same time fluorination of the matrix proceeds to form a concentration gradient of fluorine from the outside toward the central part of the magnetic particle. The difference in concentration of fluorine differs by 10% or more between the outer periphery side and the central part, and fluorine diffuses and coercive force, remnant flux density or squareness is improved. When fluorine atoms reach the central part, improvements in magnetic properties are saturated. Such an $Sm_2Fe_{17}Fx$ (x=0.2 to 5.0) has a tetragonal or cubic structure having a surface separation of 1.5 to 2.5 angstroms and an anisotropy in its atomic arrangement. When the sintered magnet is inserted at an insertion position, a gap of 0.01 to 0.5 mm is provided between the sintered magnet and the laminate electromagnetic steel plate or compacted powder. At positions of magnets including such gaps, sintered magnets having various forms such as rectangular form, a ring form, a curved form such as a hog-backed form are inserted, and a gel- or sol- or cluster-like PrF solution is injected into the gaps. The resultant is heated at a temperature not lower than 100° C. and the sintered magnets are bonded to the laminate electromagnetic steel, the laminate amorphous material or the compacted powder. On this occasion, by a further heat treatment at a temperature of 500° C. or higher, Pr or fluorine can be diffused on the surface of the magnet and elements that constitute the fluoride compound are diffused also on the surface the laminate electromagnetic steel or compacted powder, so that the magnetic properties (an increase in coercive force, an improvement in squareness, an improvement in demagnetization resistance, an increase in Curie temperature and so on) of the sintered magnet are improved to strengthen the bonding. It is possible to improve the magnetic properties of a curved working-denatured layer, which has been denatured by working, and the diffusion layer composed mainly of fluorine or rare earth elements on the surface or grain boundary of each magnetic material may contain light elements such as oxygen and carbon or at least one of Mn, Ga, Cu, Ti, Al, Fe, and Co. While the above-mentioned fluoride compound is caused to contain a rare earth element in order to improve the magnetic properties of the sintered magnet, a fluoride compound containing a rare earth element, or an alkali element or an alkaline earth element may be used in order to improve effects other than the improvement in the magnetic properties of the sintered magnet, such as effects of bonding, removal of magnetic strain or a reduction in loss.

FOURTEENTH EMBODIMENT

An SmFeF sintered magnet containing an $Sm_2Fe_{19}Fx$ (x=0.2 to 5.0) structure as a main phase is fabricated and ground and is bonded with a laminate electromagnetic steel plate, a laminate amorphous material or crushed iron powder to fabricate a rotor, the laminate electromagnetic steel plate or crushed iron powder is worked using a mold or the like at a position where a magnet is to be inserted. $Sm_2Fe_{19}Fx$ (x=0.2 to 5.0) is prepared by forming $SmF_{2-3}$ on the surface of particles having an average particle size of 0.1 to 1 μm by solution treatment to a thickness of 1 to 100 nm and heat treatment at 200 to 800° C., preforming and then sintering at a temperature higher than the heat treatment temperature. The fluoride compound after the solution treatment has a high-dimensional structure. By heat treatment, microcrystals having a particle size of 10 to 30 nm grow from a high-dimensional structure similar to an amorphous material and at the same time fluorination of the matrix proceeds to form a concentration gradient of fluorine from the outside toward the central part of the magnetic particle. The difference in concentration of fluorine differs by 10% or more between the outer periphery side and the central part, and fluorine diffuses and coercive force, remnant flux density or squareness is improved. When fluorine atoms reach the central part, improvements in magnetic properties are saturated. Such an $Sm_2Fe_{19}Fx$ (x=0.2 to 5.0) has a tetragonal or cubic structure having a surface separation of 1.5 to 2.5 angstroms and an anisotropy in its atomic arrangement. When the sintered magnet is inserted at an insertion position, a gap of 0.01 to 0.5 mm is provided between the sintered magnet and the laminate electromagnetic steel plate or compacted powder. At positions of magnets including such gaps, sintered magnets having various forms such as rectangular form, a ring form, a curved form such as a hog-backed form are inserted, and a gel- or sol- or cluster-like PrF solution is injected into the gaps. The resultant is heated at a temperature not lower than 100° C. and the sintered magnets are bonded to the laminate electromagnetic steel, the laminate amorphous material or the compacted powder. On this occasion, by a further heat treatment at a temperature of 500° C. or higher, Pr or fluorine can be diffused on the surface of the magnet and elements that constitute the fluoride compound are diffused also on the surface the laminate electromagnetic steel or compacted powder, so that the magnetic properties (an increase in coercive force, an improvement in squareness, an improvement in demagnetization resistance, an increase in Curie temperature and so on) of the sintered magnet are improved to strengthen the bonding. It is possible to improve the magnetic properties of a curved working-denatured layer, which has been denatured by working, and the diffusion layer composed mainly of fluorine or rare earth elements on the surface or grain boundary of each magnetic material may contain light elements such as oxygen and carbon or at least one of Mn, Ga, Cu, Ti, Al, Fe, and Co. Instead of Sm in $Sm_2Fe_{19}Fx$ (x=0.2 to 5.0), other light rare earth elements may be used. The ratio of Sm to Fe may be 2:17, 2:21, 2:23 and so on as well as 2:19. When Sm/Fe is smaller than 2/17, it is possible to prepare a ferromagnetic compound containing fluorine. Co may be used instead of Fe. A rare earth element is caused to be contained in the fluoride compound for the improvement of magnetic properties of the sintered magnet. However, a fluoride compound containing a rare earth element, or an alkali element or an alkaline earth element may be used in order to improve effects other than the improvement in the magnetic properties of the sintered magnet, such as effects of bonding, removal of magnetic strain or a reduction in loss.

FIFTEENTH EMBODIMENT

Figure 7:
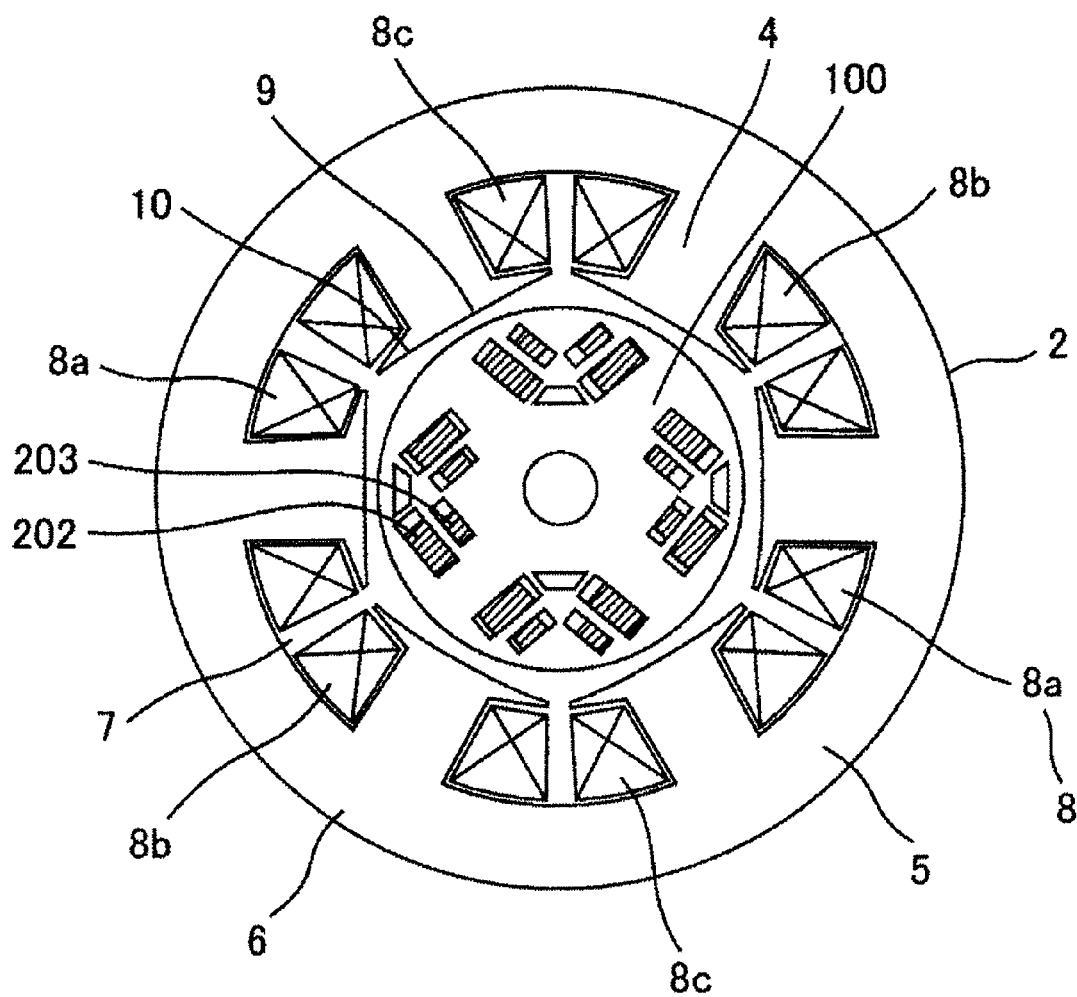
FIG. 7 is a cross-section view of a sintered magnet motor according to an embodiment of the present invention.
Figure 8:
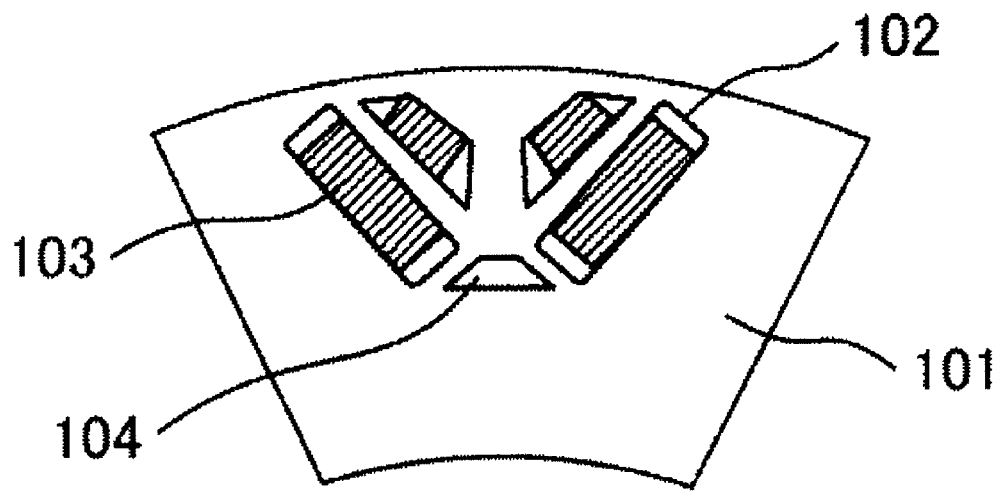
FIG. 8 shows a first example of the layout of magnets in a rotor according to an embodiment of the present invention.
Figure 9:
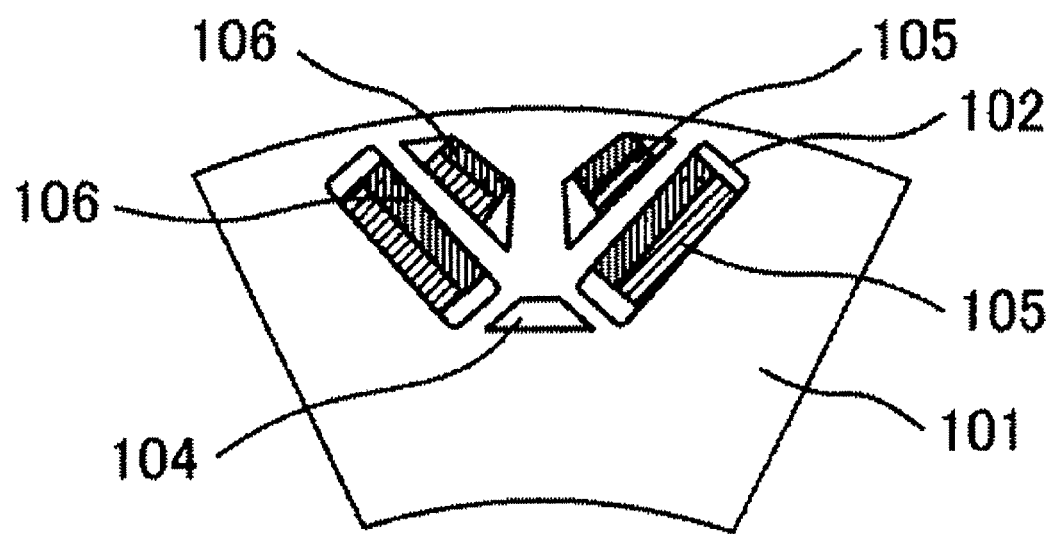
FIG. 9 shows a second example of the layout of magnets in a rotor according to an embodiment of the present invention.
Figure 10:
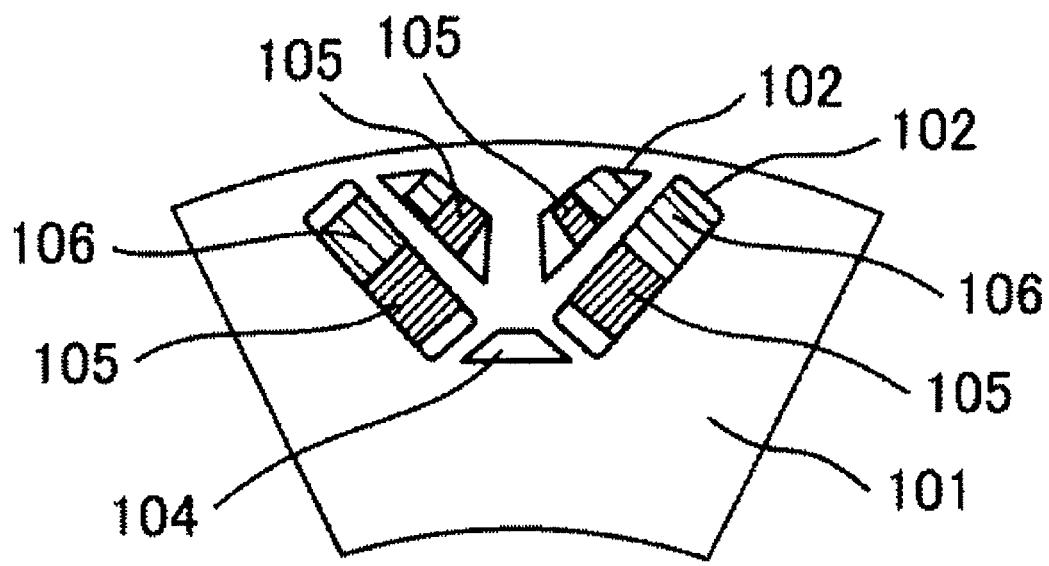
FIG. 10 shows a third example of the layout of magnets in a rotor according to an embodiment of the present invention.

Referring to FIG. 7, a motor stator 2 includes a stator iron core 6 having teeth 4 and a core back 5, and an armature winding wire 8 (three-phase winding wires consisting of a U-phase winding wire 8a, a V-phase winding wire 8b, and a W-phase winding wire 8c) in a slot 7 provided between teeth 4, with the armature wiring 8 being wound in a concentrated pattern to surround the teeth 4 for a motor. Since the motor has a 4-pole-6-slot structure, the slot pitch is 120 degrees in terms of electrical angle. A rotor is inserted into a shaft hole 9 or a rotor hole 10, and sintered magnets 202 and 203 of which the concentration gradient of fluorine is any one of those shown in FIGS. 1 to 6 are arranged on the inner periphery side of a rotor shaft 100. The sintered magnets have arcuate shapes and retain thermal resistance due to segregation of a heavy rare earth element such as Dy on a part thereof. They can be used for the production of a motor used at a temperature ranging from 100° C. to 250° C. FIG. 8 shows a magnet arrangement portion in the cross-section of a rotor, in which instead of arcuate magnets, there is formed a plurality of magnet insertion sections and sintered magnets 201 are arranged in respective magnet insertion sections. Referring to FIG. 8, sintered magnets 103 that have different shapes from each other and have any one of the concentration gradients shown in any one of FIGS. 1 to 6 are arranged. The sintered magnets have a cubic shape with corners being cut off. They retain a coercive force, thermal resistance, and corrosion resistance due to segregation of a heavy rare earth element such as Dy in a part of the grain boundary. This arrangement of magnets enables reluctance torque to be generated and segregation of fluorine to be continuously formed in the grain boundary of the sintered magnets 103, resulting in an increase in a coercive force and an increase in specific resistivity. Accordingly, the motor loss can be reduced. Segregation of Dy results in a decrease in the usage of Dy as compared to the case where no segregation of Dy occurs and the residual magnetic flux density of the magnet increases. This leads to an improvement of torque.

SIXTEENTH EMBODIMENT

Figure 11:
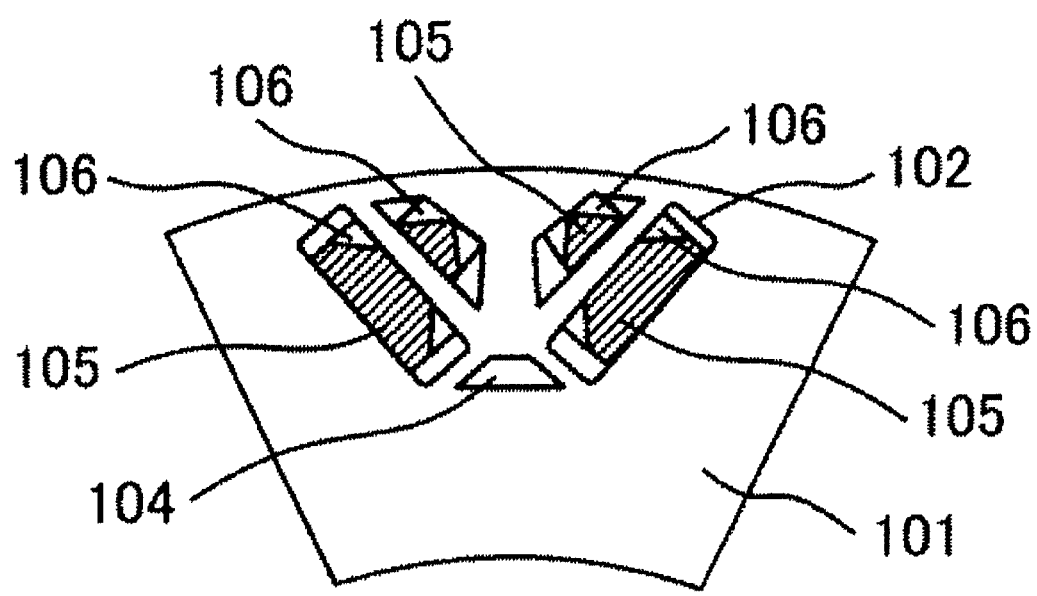
FIG. 11 shows a fourth example of the layout of magnets in a rotor according to an embodiment of the present invention.

FIGS. 8 to 11 each show a cross-sectional configuration of the rotor for each pole. These figures each show a rotor 101 that uses reluctance torque and magnet torque. The rotor 101 is provided with a space 104 in which no magnet is arranged for reluctance torque. A hole is formed in the laminated steel sheets by punching or the like method in advance in a position in which the magnet is to be inserted. This hole serves as a magnet insertion hole 102. The magnet rotor can be fabricated by inserting a sintered magnet 103 in the magnet insertion hole 102. The sintered magnet 103 is a magnet that contains fluorine that has segregated in a part of the grain boundary of the sintered magnet and has magnetic properties of a coercive force of 10 kOe or more and a residual magnetic flux density 0.6 to 1.5 T. As shown in FIG. 11, sintered magnets having a high concentration of fluorine or a heavy rare earth element are arranged on the inner diameter side and on the outer diameter side near the outer periphery of the rotor in the magnet insertion holes 102. Thus, the pole includes a sintered magnet 106 having a high concentration of fluorine or heavy rare earth element and a sintered magnet 105 having a low concentration of fluorine. Such sintered magnets can be fabricated by coating a solution containing fluorine on one side of the magnet and then allowing the fluorine to diffuse into the magnet. A ratio of fluorine concentrations (maximum concentration/minimum concentration ratio) is 1 to 10,000 on average. It is also possible to increase the coercive force of the magnet 106 having a high concentration of fluorine by causing a metal element to segregate together with the fluorine. The above-mentioned sintered magnets include a material having a high coercive force with a high concentration of fluorine and a material having a high residual magnetic flux density with a low concentration of fluorine. As a result the rotor can achieve a high resistance to demagnetization for an inverse magnetic field during operation and a high torque characteristic. Therefore, the sintered magnets are suitable for an HEV (hybrid electric vehicle) motor.

The present invention can provide a magnet that realizes high resistivity, high coercivity, and high magnetic flux density by forming an optically transparent film containing fluorine on the iron-based magnetic particles, heat treating, and molding as mentioned above. It is possible to obtain low loss and high induction voltage by applying the molded product to a rotating machine. The invention can be applied to magnetic circuits featured by low loss including various rotating machines.

It should be further understood by those skilled in the art that although the foregoing description has been made on embodiments of the invention, the invention is not limited thereto and various changes and modifications may be made without departing from the spirit of the invention and the scope of the appended claims.

What is claimed is:

1. An R—Fe—B sintered magnet comprising a rare earth, iron and boron having a structure that includes main phase crystal grains and a grain boundary area surrounding the crystal grains, wherein:
    the sintered magnet includes fluorine and a specified metal element selected from elements belonging to Group 2 through Group 16 of periodic table excepting the rare earth element, carbon and boron,
    the fluorine has a concentration that is higher in a region closer to a surface of the magnet than in the center of the magnet,
    the specified metal element has a concentration which is higher in the region closer to the surface of the magnet than in the center of the magnet,
    the sintered magnet includes oxyfluoride containing carbon, Dy and the specified metal element in a region of the grain boundary area at a distance of equal to or greater than 1 μm from the surface of the magnet, and
    the carbon has a concentration that is higher than the concentration of the specified metal element in a region at a distance of from 1 μm to 500 μm from the surface of the magnet.

2. An R—Fe—B sintered magnet according to claim 1, wherein:
    the concentration of Dy is greater than the concentration of the fluorine in a region at a distance of from 1 μm to 500 μm from a surface of the magnet.

3. An R—Fe—B sintered magnet according to claim 1, wherein:
    in a region where the concentration of fluorine is relatively high within the whole magnet, the concentration of the specified metal element is relatively high within the whole magnet.

4. An R—Fe—B sintered magnet according to claim 1, wherein:
    the concentration of the specified metal element in the grain boundary area is higher than the concentration of the metal element in the center of the main phase crystal grains.

5. An R—Fe—B sintered magnet according to claim 1, wherein:
    the grain boundary area has a width of from 0.1 nm to 20 nm.

6. An R—Fe—B sintered magnet according to claim 1, wherein:
    the sintered magnet is a product obtained by using a DyF-based solution in which an organic metal compound contains the specified metal element and heat treating the solution at a temperature in the range of from 400° C. to 1,100° C.

* * * * *